(12) United States Patent
Robinson et al.

(10) Patent No.: US 8,897,571 B1
(45) Date of Patent: *Nov. 25, 2014

(54) DETECTION OF TARGETS FROM HYPERSPECTRAL IMAGERY

(75) Inventors: Ian S. Robinson, Redondo Beach, CA (US); James J. Dwulit, Centereach, NY (US); C. Ralph Waters, Port Jefferson, NY (US); Bradley A. Flanders, Whittier, CA (US)

(73) Assignee: Raytheon Company, Waltham, MA (US)

( * ) Notice: Subject to any disclaimer, the term of this patent is extended or adjusted under 35 U.S.C. 154(b) by 800 days.

This patent is subject to a terminal disclaimer.

(21) Appl. No.: 13/077,228

(22) Filed: Mar. 31, 2011

(51) Int. Cl.
*G06K 9/46* (2006.01)
*G06K 9/40* (2006.01)

(52) U.S. Cl.
USPC ........... 382/191; 382/103; 382/274; 356/302; 356/303; 250/339.01

(58) Field of Classification Search
USPC .................. 382/103, 191, 274; 356/302, 303; 250/339.01
See application file for complete search history.

(56) References Cited

U.S. PATENT DOCUMENTS

| | | | |
|---|---|---|---|
| 6,008,492 A | 12/1999 | Slater et al. | |
| 6,167,156 A * | 12/2000 | Antoniades et al. | 382/232 |
| 6,504,943 B1 | 1/2003 | Sweatt et al. | |
| 6,665,438 B1 | 12/2003 | Lin | |
| 6,678,048 B1 | 1/2004 | Rienstra et al. | |
| 6,771,798 B1 * | 8/2004 | Haas et al. | 382/103 |
| 7,194,111 B1 | 3/2007 | Schaum et al. | |
| 8,264,400 B2 * | 9/2012 | Yapa et al. | 342/90 |
| 2006/0188161 A1 | 8/2006 | Gruninger et al. | |
| 2006/0233421 A1 | 10/2006 | Portigal et al. | |
| 2007/0076955 A1 | 4/2007 | Schaum et al. | |
| 2009/0074297 A1 | 3/2009 | Robinson | |

OTHER PUBLICATIONS

Chang et al., "A New Destriping Method of Imaging Spectrometer Images", 2007, Proceed. of the 2007 International Conference on Wavelet Analysis and Pattern Recognition, 437-441.*
Koudelka et al., "Multinomial Pattern Matching for High Range Resolution Radar Profiles",2007, Algorithms for Synthetic Aperture Radar Imagery XIV, Proc. of SPIE vol. 6568, 65680V-1-65680V-12.*
Meza et al., "Applied Non-Uniformity Correction Algorithm for Striping Noise Removal in Hyperspectral Images", Oct. 4-8, 2010, Latin America Remote Sensing Week, Chile.*

(Continued)

*Primary Examiner* — Katrina Fujita
(74) *Attorney, Agent, or Firm* — Burns & Levinson, LLP; Joseph M. Maraia

(57) ABSTRACT

Provided is a process and system for detection of sparse or otherwise weak targets in a hyperspectral image. A hyperspectral image is received having a multitude of pixels, with each pixel having a respective spectrum. In some embodiments, multiple mean spectra are selectively determined for respective sub-regions of the hyperspectral image. The subset mean spectra can be selectively removed from respective pixels, thereby improving image fidelity due to sensor artifacts. Additionally, target detection of such an adjusted image can be determined by one or more of matched filter techniques or by partial un-mixing. In at least some embodiments target detection is enhanced by combining a measure of target match with a residual spectrum determined as a measure of un-match. Target detection can be further improved by application of rules, for example, related to target detection threshold.

16 Claims, 14 Drawing Sheets

(56) References Cited

OTHER PUBLICATIONS

Robinson et al., "Comparison of Hyperspectral Sub-]Pixel Detection With and Without a Priori Knowledge of Target Features", 1998, IEEE Aerospace Conference, vol. 5, 183-189.*

Thai et al., "Invariant Subpixel Material Detection in Hyperspectral Imagery", 2002, IEEE Transactions on Geoscience and Remote Sensing, vol. 40, No. 3, 599-608.*

Manolakis et al., "Detection Algorithms for Hyperspectral Imaging Applications", 2002, IEEE Processing Magazine, vol. 19, Issue:1. 29-43.*

Jacobsen et al.; Monitoring Grasslands Using Convex Geometry and Partial Unmixing—A Case Study; 1st EARSel Workshop on Imaging Spectroscopy; Oct. 1998; pp. 309-316.

Nielsen; Spectral Mixture Analysis: Linear and Semi-parametric Full and Iterated Partial Unmixing in Multi-and Hyperspectral Image Data; International Journal of Computer Vision; vol. 42; Nos. 1 and 2; 2001; pp. 17-37.

Keshava et al.; Spectral Unmixing; IEEE Signal Processing Magazine; Jan. 2002; pp. 44-57.

Mundt et al.; Partial Unmixing of Hyperspectral Imagery: Theory and Methods; ASPRS 2007 Annual Conference; May 7-11, 2007; pp. 1-12.

Smith; Introduction to Hyperspectral Imaging; http://www.microimages.com; Jul. 14, 2006; pp. 1-24.

Manolakis et al.; Is There a Best Hyperspectral Detection Algorithm?; Proceedings of SPIE; vol. 7334; No. 2; 2009; pp. 1-16.

Ientilucci et al.; Target Detection in a Structured Background Environment Using an Infeasibility Metric in an Invariant Space; Algorithms and Technologies for Multispectral, Hyperspectral, and Ultraspectral Imagery XI; Proceedings of SPIE; vol. 5806; pp. 491-502; 2005.

Kruse et al.; Extraction of Compositional Information for Trafficability Mapping from Hyperspectral Data; SPIE International Symposium on AeroSense; vol. 4049; pp. 262-273; Apr. 2000.

Manolakis et al.; Is There a Best Hyperspectral Detection Algorithm?; SPIE Newsroom; DOI: 10.1117/2.1200906.1560; pp. 1-3; Jun. 17, 2009.

Foy et al.; "Decision Boundaries in Two Dimensions for Target Detection in Hyperspectral Imagery"; Optics Express; 17(20):17391-17411 (2009).

Funk et al.; "Clustering to Improve Matched Filter Detection of Weak Gas Plumes in Hyperspectral Thermal Imagery"; IEEE Transactions on Geoscience and Remote Sensing; 39(7):1410-1420 (2001).

Halper; "Global, Local, and Stochastic Background Modeling for Target Detection in Mixed Pixels"; The MITRE Corporation; Case #: 10-0838; 13 pages, Apr. 2010.

Kerekes et al.; "Hyperspectral Imaging System Modeling"; Lincoln Laboratory Journal; 14(1):117-130 (2003).

Manolakis et al.; "Detection Algorithms for Hyperspectral Imaging Data Exploitation"; MIT Lincoln Laboratory—ASAP 2002; 9 pages (2002).

Manolakis; "Standoff Detection and Identification of Chemical Plumes with Long Wave Hyperspectral Imaging Sensors"; MIT Lincoln Laboratory; RTO-MP-SET-151; pp. [2-1]-[2-10] (2009).

Messinger et al.; "Detection of Gaseous Effluents from Airborne LWIR Hyperspectral Imagery Using Physics-Based Signatures"; Institute of Technology; pp. 712-723, 2007.

* cited by examiner

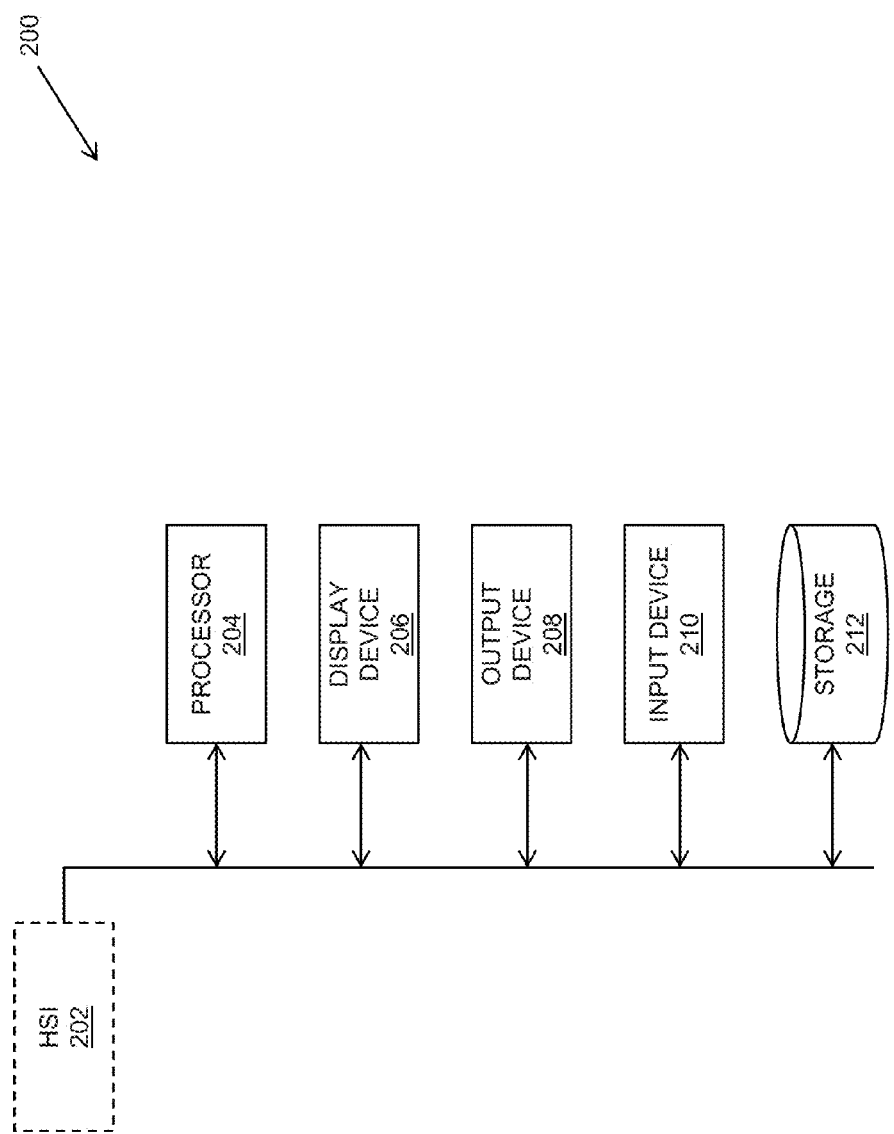

DETECTION OF TARGETS FROM HYPERSPECTRAL IMAGERY

TECHNICAL FIELD

Various embodiments are described herein relating generally to the field of hyperspectral image processing and the like, and more particularly to the detection of sparse, weak or otherwise dim targets within a hyperspectral image.

BACKGROUND

A black-and-white photograph of an object or a geographic area is a two dimensional construct of the actual image or area—for each x, y coordinate in the image there is a single value blackness or whiteness of that particular image spot. As human beings, the eye can perceive useful information about objects or areas based on the differences between black, white, and the shades of gray.

Color photographs add more visual information, but for most purposes the color information that is represented is tied to the visual spectrum. For each x, y coordinate in the image there is an approximation of the visual color spectrum of that particular image spot created through the blending of three color values, such as for example Red, Green, and Blue.

Multi-spectral sensing systems such as the Landsat Thematic Mapper remote imager and weather satellites produce images with a few relatively broad wavelength bands. The imager may capture a visual spectrum image and also one in infrared, but still they are limited in their ability to perceive information that may otherwise be present in a different part of the spectrum.

Hyperspectral sensors, on the other hand, collect image data across dozens if not hundreds of spectral bands, combining the technology of spectroscopy and remote imaging. The measurements captured by hyperspectral sensors make it possible to derive a contiguous spectrum for each image pixel. In other words for each x, y coordinate of an image (i.e., a pixel), rather than a single value for a gray or visible color, there is a third dimension—a vector, providing distinct information for that particular pixel across the large spectrum of wavelengths.

As different materials reflect wavelengths of visible and invisible light selectively, analysis of the contiguous wavelength spectrum permits finer resolution and greater perception of information contained in the image, through separation and evaluation of different wavelengths. For example, inorganic materials such as minerals, chemical compositions and crystalline structures control the shape of a representative spectral curve and the presence and positions of specific absorption bands.

The spectral reflectance curves of organic materials, such as healthy green plants also have a characteristic shape that is dictated by various plant attributes, such as the absorption effects from chlorophyll and other leaf pigments. Leaf structure varies significantly between plant species, and can be affected by plant stress. Therefore species type, plant stress and canopy state can all affect near infrared reflectance measurements, which are captured by hyperspectral sensors.

In addition, for a given pixel, a combination of different materials, e.g., biological, chemical, mineral, will provide a composite signal. Upon analysis and through comparison to known signal waveforms (e.g., known spectra) it is frequently possible to derive the presence of materials within a pixel, and therefore appreciate a detection granularity that is greater than the actual pixel resolution.

Hyperspectral sensors providing hyperspectral imaging can therefore be beneficially applied in a wide array of practical applications. Examples of such uses include aid in the detection of chemical or biological weapons, bomb damage assessment of underground structures, drug production and cultivation, as well as the detection of friend or foe troops and vehicles beneath foliage or camouflage.

Some targets are relatively easy to detect using standard techniques; whereas, other may not be. For example, detection of a terrain, such as asphalt, or concrete may be relatively straightforward for some images in which pixels (ground resolution cells) are filled by substantially the same material (e.g., asphalt or concrete). Alternatively, the measured signatures of a dispersed target, such as a gaseous plume, are complicated by a combination of phenomenology including effects of the atmosphere, spectral characteristics of the background material under the plume, temperature contrast between the gas and the surface, and the concentration of the gas. All of these quantities vary spatially further complicating the detection problem. For example, an effluent target in a low wind and having a relatively dense and very bright target signature on at least a few contiguous pixels may be relatively easy to detect, even with a substantially high threshold. Accordingly, such relatively easy to detect targets would require minimal or no spatial processing. Alternatively, targets in a high wind and/or sparse, or weak may be present in dozens to hundreds pixels of a given image. Unfortunately, all or most such pixels may be below conventional thresholds.

Spectral references of targets in a hyperspectral image scene are compared to each pixel to determine the presence/absence of the targets in that pixel. Detection of such dispersed targets requires integration of signal along plume by algorithm or eye (e.g., an analyst) without confusion from noise, clutter, and/or sensor artifacts.

One approach for improving detection would be to enhance the resolution of the remote sensing system used in obtaining a hyperspectral image (HSI). It is generally understood that a minimum detectable quantity (MDQ) scales with resolution of the imaged terrain, referred to herein as ground sample distance (GSD). A small GSD associated with a high resolution would improve detectability of such targets as each sampled cell would have a higher percentage of the target. Unfortunately, a small GSD would be an expensive quantity to achieve. This would be particularly true for HSI data obtained from space-based sensors.

Widely used target identification techniques include Spectral Matched Filter (SMF), also called Constrained Energy Minimization, and Adaptive Coherence/Cosine Estimator (ACE). Each of these techniques compares a priori known target spectrum to measurement (e.g., pixel spectra of an HSI data cube). Such techniques may be modified by an estimate of the image background. A common family of algorithms for statistically characterizing a scene's background use a background covariance matrix E. Both algorithms are computationally efficient and easy to implement and detect fairly bright targets in clutter. Unfortunately, both produced relatively high levels of false alarms, for dispersed targets, such as dim, gaseous effluents. This is due at least in part to targets having lower filter scores than many background pixels.

Other techniques addressing this problem describe mixture tuned matched filters, for example, also using minimum noise fraction transforms, such as the work of Mundt, J., Streutker, D. and Glenn, N. in "Partial Unmixing of Hyperspectral Imagery: Theory and Methods," Proceedings of the American Society of Photogrammetry and Remote Sensing (2007). Unfortunately, such alternatives are very complicated, requiring the use of minimum noise fraction transforms, interpolation of eigenvalue vectors and the like. Other approaches, such as the work of Lentilucci and Schott, in "Target Detection in a Structured Background Environment Using an Infeasibility Metric in an Invariant Space," in Algorithms and Technologies for Multispectral Hyperspectral, and Ultraspectral Imagery XI, Shen and Lewis, Eds., Proceedings of SPIE Vol. 5806 are likewise computationally complex, also requiring spectral matched filtering, linear unmixing and minimum noise fraction techniques in addition to identification of a target covariance matrix.

Hence there is a need for an improvement in target detection techniques for use with hyperspectral images that overcome one or more of technical problems noted above.

SUMMARY

Described herein are embodiments of systems and techniques for detecting, identifying, and in at least some instances determining a quantity of one or more sparse, weak targets, such as low-mass-flow effluents, through analysis of an HSI data cube. In particular embodiments, techniques are employed to substantially reduce or eliminate at least some of the disadvantages and problems associated with previous methods and systems for processing such information. For example, detection can be improved by pre-adjusting a hyperspectral image to remove artifacts introduced into sub-scenic regions of the image during image capture (e.g., image striping due to variations between different physical sensors). Alternatively or in addition, a measure of an uncorrelated or otherwise un-matched portion of a hyperspectral image is determined and combined with matched filter score or partial un-mixing coefficients in a relatively simplistic manner to improve one or more of resolution and reliability of the detection of one or more targets.

In one aspect, at least one embodiment described herein supports a process for use in determining the presence of a target substance. The process includes receiving a hyperspectral image comprising spectra of a plurality of scene pixels indicative of light and other radiation absorbed by or emitted from, a target substance. A respective mean spectrum is determined from a subset of scene pixels. Each scene pixel in the subset is adjusted through subtraction of the respective mean spectrum from the respective spectrum of the scene pixel. The acts of determining a respective mean spectrum and adjusting each scene pixel are repeated for other subsets of scene pixels of the received hyperspectral image. A measure of spectral match between a respective spectrum of the scene pixel and a reference spectrum of the target substance is determined for each adjusted scene pixel, and a presence of the target substance within the hyperspectral image is detected in response to the determined measure of spectral match.

In some embodiments, determining the measure of spectral match includes applying a filter adapted to measure angular deviation between the spectrum of the scene pixel and the reference spectrum of the target substance.

In some embodiments, the process further includes a measure of spectral mismatch between the respective spectrum of the scene pixel and the reference spectrum determined for each adjusted scene pixel of the target substance, and presence of the target substance being detected within the hyperspectral image in response to the determined measures of spectral match and spectral mismatch.

In some embodiments, determining the measure of spectral mismatch includes determining spectral energy of the scene pixel not matched or otherwise in the direction of the reference spectrum of the target substance.

In some embodiments, detecting a presence of the target substance comprises forming a ratio of the measure of spectral match and the measure of spectral mismatch, the ratio being indicative of presence of the target substance within the scene pixel.

In some embodiments, detecting a presence of the target comprises applying a rule, whereby formulation of the ratio is accomplished selectively in response to application of the rule.

In some embodiments, the process further includes generating a human-readable image indicative of the determined measure of spectral mismatch for scene pixels of the hyperspectral image. Such a human-readable image can be used, for example, in detecting presence of the target substance within the hyperspectral image.

In some embodiments, detecting a presence of the target substance includes standardizing a measure of spectral match and forming a ratio of the standardized measures of the spectral match and the spectral mismatch. The ratio is indicative of presence of the target substance within the scene pixel.

In some embodiments, the process further includes applying a spatial filter, such that detection of the presence of the target substance within the hyperspectral image is accomplished responsive to the determined measures of spectral match and spectral mismatch subject to the spatial filter.

In another aspect, at least one embodiment described herein relates to a system adapted to detect the presence of a target substance. The system includes image storage configured to store at least a portion of a hyperspectral image comprising spectra of a multitude of scene pixels indicative of light and other radiation absorbed by or emitted from, a target substance. The system further includes target spectra storage configured to store a reference spectrum of the target substance and a filter in communication with the image storage. The filter is configured to determine from a subset of scene pixels a respective mean spectrum and to adjust each scene pixel in the subset through subtraction of the respective mean spectrum from the scene pixel spectrum. The filter is further configured to repeat the acts of determining a respective mean spectrum and adjusting each scene pixel for other subsets of scene pixels in the received hyperspectral image. A target scoring engine is provided in communication with the target spectra storage and at least one of the image storage and the filter. The target scoring engine is configured to determine for each scene pixel a measure of spectral match between a respective spectrum of the scene pixel and a reference spectrum of the target substance. The system also includes a target detector in communication with the target scoring engine and the non-target scoring engine. The target detector is configured to determine presence of the target substance within the hyperspectral image in response to the determined measure of spectral match.

In some embodiments, the target scoring engine comprises a filter selected from the group consisting of: spectral matched filters and adaptive coherence/cosine estimator (ACE) filters.

In some embodiments, the system further includes a non-target scoring engine in communication with the target spectra storage and at least one of the image storage and the filter, the target scoring engine is configured to determine, for each scene pixel, a measure of spectral mismatch between a respective spectrum of the scene pixel and the reference spectrum of the target substance. The target detector, in turn, is configured to determine presence of the target substance within the hyperspectral image in response to determined measures of spectral match and spectral mismatch.

In some embodiments, the system further includes a human readable image generator in communication with the non-target scoring engine. The image generator is adapted to generate an image indicative of the determined measure of spectral mismatch for scene pixels of the hyperspectral image. The human readable image generator can be used, for example, in detecting presence of the target substance within the hyperspectral image.

In some embodiments, the target detector includes a rule engine configured to implement a predetermined rule. The target detector can be configured to determine presence of the target substance within the hyperspectral image in response to the determined measures of spectral match and spectral mismatch according to the predetermined rule.

In another aspect, at least one embodiment described herein relates to a system adapted to detect the presence of the target substance. The system includes means for receiving a hyperspectral image comprising spectra of a multitude of scene pixels indicative of light and other radiation absorbed by or emitted from, a target substance. The system further includes means for determining, from a subset of scene pixels, a respective mean spectrum and means for adjusting each scene pixel in the subset, through subtraction of the respective mean spectrum from the respective spectrum of the scene pixel. Further means are provided for repeating the acts of determining a respective mean spectrum and adjusting each scene pixel for other subsets of scene pixels of the received hyperspectral image. The system also includes means for determining for each adjusted scene pixel, a measure of spectral match between a respective spectrum of the scene pixel and a reference spectrum of the target substance, and means for detecting a presence of the target substance within the hyperspectral image in response to the determined measure of spectral match.

In some embodiments, this measure is derived in part from a matched filter adapted for subset mean (e.g., column mean) removal. Alternatively or in addition, this measure is derived in part from a partial un-mixing of one or more targets alone or in combination with other basis vectors related to the imaged scene.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 5 illustrates a block diagram of an embodiment of a hyperspectral image processing system.

DETAILED DESCRIPTION

A description of embodiments of systems and processes for detecting, identifying, and in at least some instances determining a quantity of one or more sparse, weak targets, such as low-mass-flow gaseous effluents, through analysis of a hyperspectral image follows. Beneficially, the techniques described herein include non-complex algorithms that reduce false alarms due to clutter and sensor artifacts, also supporting multi-pixel aggregation of weak but spatially extended effluents.

Figure 1:
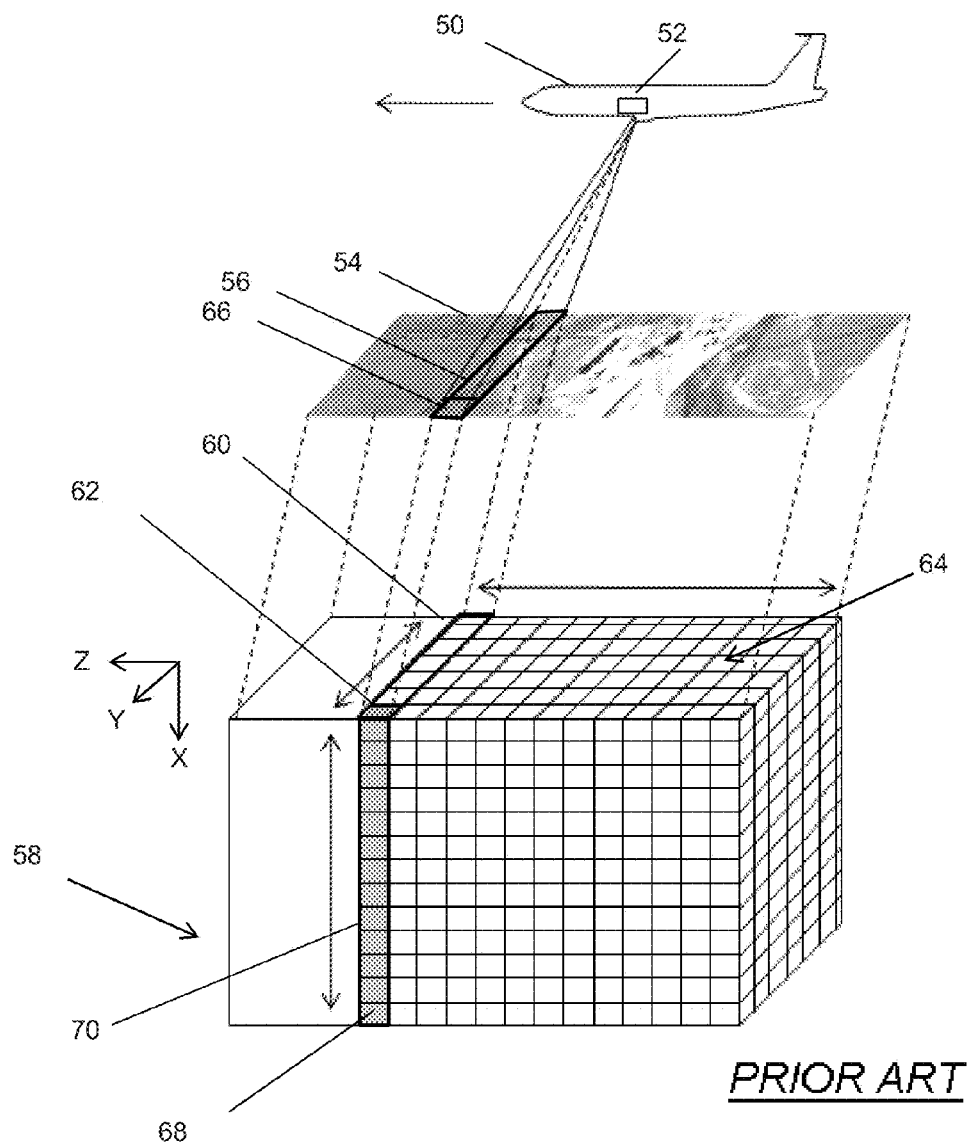
FIG. 1 illustrates a simplified diagram of an embodiment of a hyperspectral imaging system capturing and generating a hyperspectral image (HSI) data cube as may be processed in accordance with at least one embodiment of the hyperspectral image processing techniques described herein.

FIG. 1 illustrates a simplified diagram of an embodiment of a hyperspectral imaging system adapted for capturing and generating hyperspectral image (HSI) data. A mobile platform 50 containing an HSI imaging system 52 is positioned above terrain 56 to be imaged. The mobile platform 50 can be any suitable platform, such as a fixed wing aircraft, a helicopter, a lighter-than-air vehicle, and a satellite. The HSI imaging system 52 is arranged on the platform 50 to view a particular region of terrain 56. In the example embodiment, the viewed region is substantially rectangular with an elongated dimension arranged transverse to a direction of motion of the platform 50 (e.g., parallel to y-axis).

The HSI imaging system 52 captures radiation reflected, refracted, radiated, scattered or otherwise modified and returned by the imaged terrain 56. In at least some embodiments, the radiation results from solar radiation returned from the terrain 56. As illustrated, the platform 50 can be mobile. As such, the HSI imaging system 52 is configured to obtain periodic updates to the imaged terrain 56, such that an extended surface 54 of the terrain can be imaged, referred to as a scene 64.

A graphical representation of example HSI data, sometimes referred to as an HSI data cube 58 is illustrated below the terrain 54. A top surface 64 of the cube 58, defined in the y-z plane represents a two-dimensional array of imaged cells, or pixels. A rectangular arrangement of image pixels 60 forming a row parallel to the y-axis represents one sample of the imaged terrain 56. In at least some embodiments, the imaged row itself includes several pixels 62 extending along the row of pixels 60. A single pixel 62 corresponds to a minimum resolution cell of the imaged terrain 56. The minimum resolution is sometimes referred to as ground sample distance (GSD)—a center-to-center spacing of adjacent pixels. Each pixel 62, in turn, is imaged by the HSI image system 52 to produce a spectrum associated with radiation returned from the imaged cell 66. The spectrum can be partitioned, for example into several frequency bins 68, and stored in an array 70 associated with each pixel 62. In the example HSI data cube 58, the spectral array 70 is oriented parallel to the x-axis.

Figure 2:
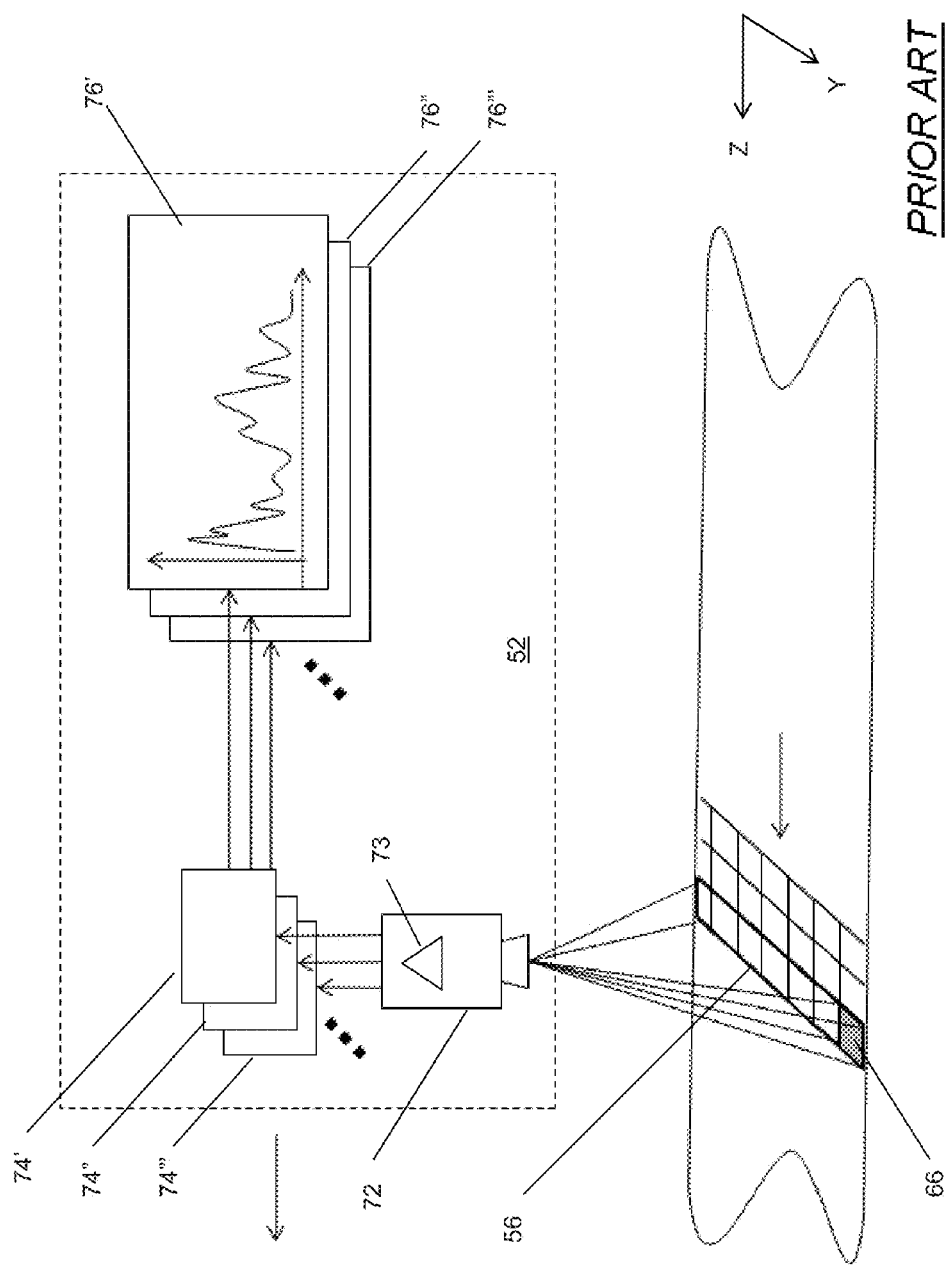
FIG. 2 illustrates a more detailed diagram of an embodiment of a hyperspectral imaging system for capturing reference spectra associated with each pixel of an imaged area represented in an HSI data cube, such as the one illustrated in FIG. 1.

FIG. 2 illustrates a more detailed diagram of an embodiment of the HSI imaging system 52 illustrated in FIG. 1. The system 52 includes an optical subsystem 72 configured to capture an image of the terrain 56. The optical subsystem 72 includes at least one dispersive element 73, such as a prism or diffraction grating, positioned to spatially disperse the imaged radiation according to variations in wavelength of the returned radiation. An array of detectors 74' is positioned to capture the dispersed radiation for the corresponding imaged cell 66 of the imaged region 56. Individual detectors of the array of detectors 74' can be any suitable detector, such as a photodiode, a photomultiplier, etc., adapted to convert captured radiation to an electrical signal (e.g., a voltage or a current) indicative of the imaged energy. In some embodiments, multiple arrays of detectors 74', 74", 74''' (generally 74) are provided to image multiple pixels simultaneously, such as an entire row of pixels 60 of an imaged scene. Accordingly, imaging of a region of terrain 56 by the HSI imaging system 52 results in an array of multiple spectra 76', 76", 76''' (generally 76), one for respective imaged cell 66 of the imaged terrain 56.

Figure 3:
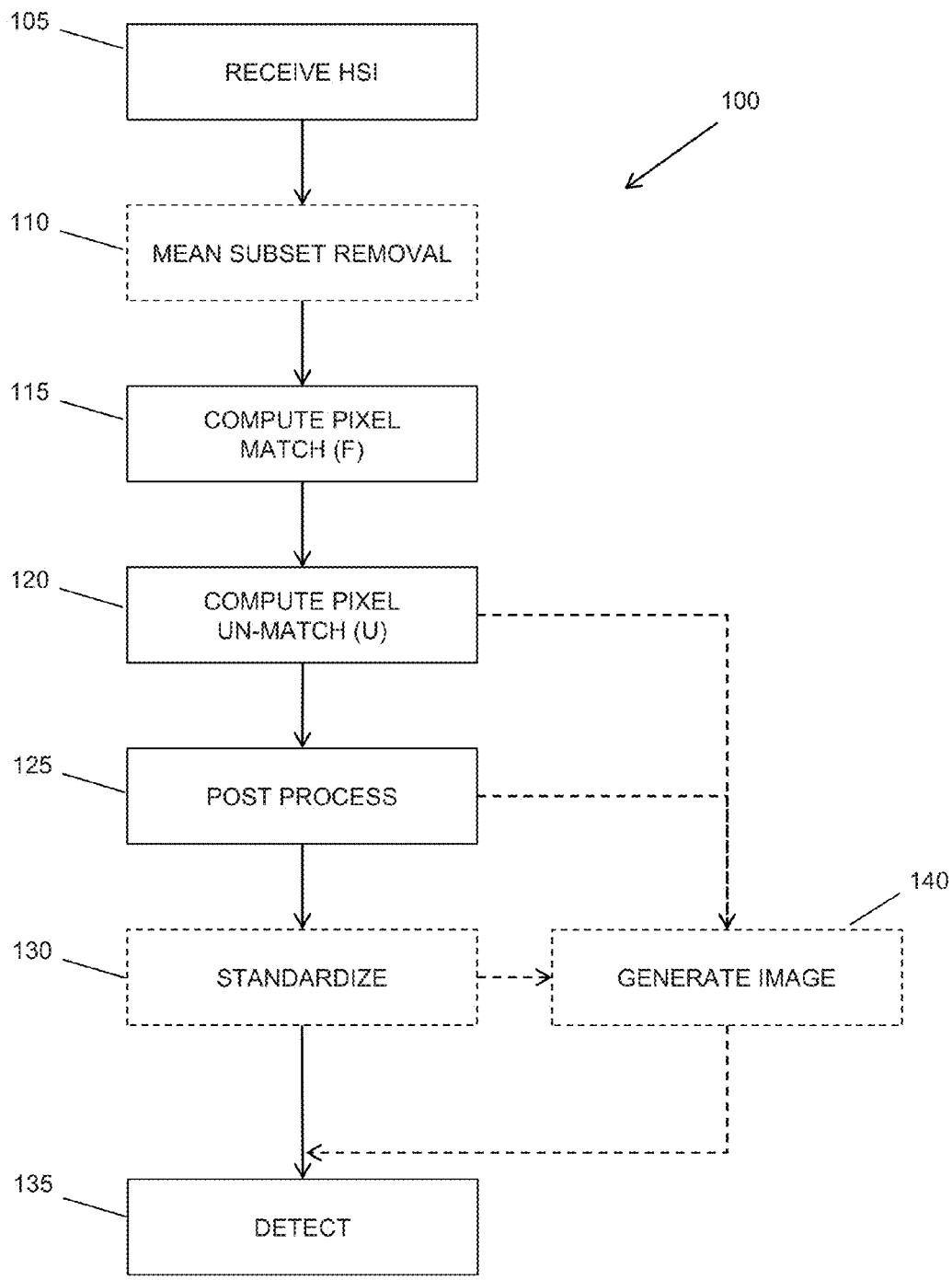
FIG. 3 illustrates a flowchart detailing alternative embodiments of techniques for processing HSI data to detect or otherwise identify sparse and/or weak targets contained therein.

FIG. 3 illustrates a flow diagram of an embodiment of a technique for processing HSI data 58. HSI data, such as the example HSI data cube 58 shown in FIG. 1, are received at 105. The HSI data include spectra for a collection of pixels constituting a scene, for example, obtained from imaged terrain. In some embodiments, a respective mean spectrum is subtracted or otherwise removed from one or more of the pixel spectra (X) and target spectra ($\lambda_t$). For example, in some embodiments, a single mean spectrum is determined for a scene by averaging the spectra of substantially all pixels of the scene. Such a scene-wide average spectrum can be referred to as a scene or background spectrum ($\mu_b$). Alternatively or in addition, respective mean spectra are determined for various subsets of pixels of an imaged scene. Such subset average spectra are referred to herein as subset mean spectra ($\mu_s$), and likewise subtracted or otherwise removed at 110 from one or more of the target and pixel spectra included in the subset used to determine the subset mean spectrum. (The corresponding act 110 is shown in phantom indicating that is optional.) The process can be repeated for substantially all pixels of an HSI imaged scene, dividing pixels of the scene into multiple subsets, determining a respective average spectrum for each subset and using the corresponding subset mean spectrum to offset or otherwise adjust the spectrum of each pixel in the subset. Such adjustments can be accomplished separately, before computation of a match score (as shown) or during processing of the match score.

Advantageously, subsets of a scene can be selected to compensate or otherwise correct for variations as may be introduced into the HSI data, for example, during the image capture process. One such factor contributing to variations relates to sensor artifacts. Such artifacts may result from variations in sensitivity and/or responsiveness among the different arrays if detectors 74, leading in at least some instances to corresponding variations in captured data.

In the example HSI system shown in FIG. 2, such artifacts may lead to variations perceived as "striping" in grayscale images of the captured HSI data, extending along lengthwise columns of the scene (e.g., parallel to the z-axis). Such variations related to sensor artifacts can lead to errors in detections obtained with respect to a target substance. In this example, a subset mean spectrum can be determined separately for each column of the image by averaging the spectra of substantially all scene pixels in that column. In the illustrative example, an HSI imaged scene having N columns would have N different corresponding subset mean spectra ($\mu_{s1}, \mu_{s2}, \ldots, \mu_{sN}$). A grayscale image of modified pixel spectra ($X_{MSR}$) having respective mean subset spectrum removed corrects or otherwise removes perceived striping, sometimes referred to as "de-striping." Grayscale images can be obtained, for example, by computing a magnitude of each pixel's spectrum for substantially all pixels of the scene. A magnitude can be determined as a root-sum-square combination of substantially all spectral bands of each pixel's spectrum.

A measure of a degree to which a pixel's spectrum matches a target spectrum is determined for each pixel at 115. This measure of degree of match is sometimes referred to as a score or match. One popular class of filters for determining such matches is referred to as spectral matching filters (SMF). An example calculation of a matched score $MF_b$ using a spectral matching filter is provided in Eqn. 1A.

$$MF_b = \frac{(S - \mu_b)^T \sum_b^{-1} (X - \mu_b)}{(S - \mu_b)^T \sum_b^{-1} (S - \mu_b)} \qquad \text{Eqn. 1A}$$

In the illustrative matched filter examples, the value X (an n×1 vector) represents a spectrum of a scene pixel being evaluated, the value S (an n×1 vector) represents a known target spectrum, the value $\mu_b$ (also an n×1 vector) is a background mean spectrum, and $\Sigma_b$ is a covariance matrix (an n×n matrix) determined using background mean spectra, for example, the individual elements of $\Sigma_b$ determined according to the formula $\Sigma_{bij} = E[(X_i - \mu_{bi})/(X_j - \mu_{bj})]$ using X for substantially every scene pixel and applying the background mean spectra $\mu_b$. Preferably, target or target-like pixels are not included in such a calculation. "E" represents the expectation of the adjusted pixel spectra as offset by the mean subset or background.

In general, when computing a covariance matrix Σ, a scene can be segmented or otherwise partitioned into subsets of more homogenous regions. Preferably, each such segment is large enough to provide good statistics for Σ (a rule of thumb is that such a sub-region is at least as large as the number of spectral bands squared.

For embodiments including removal of subset mean spectra, different subset mean spectra $\mu_s$ are determined for each respective subset of scene pixels. Likewise, when using mean subset removal, the covariance matrix can be computed using respective subset mean spectra for those pixels used in computation of the subset mean spectra. An example calculation of a matched score using a spectral matching filter with mean subset removal $MF_s$ is provided in Eqn. 1B. Optionally, the full scene mean may be computed and subtracted from all pixels prior to applying the matched filter in addition to or in lieu of the subset set mean.

$$MF_s = \frac{(S - \mu_s)^T \sum^{-1} (X - \mu_s)}{(S - \mu_s)^T \sum^{-1} (S - \mu_s)} \qquad \text{Eqn. 1B}$$

Another calculation of a matched score using a variant spectral matching filter is provided in Eqn. 2A.

$$MF_b' = \frac{(S-\mu_b)^T \sum_b^{-1} (X-\mu_b)}{\left[(S-\mu_b)^T \sum_b^{-1} (S-\mu_b)\right]^{1/2}} \quad \text{Eqn. 2A}$$

A similar calculation of a matched score using mean subset removal is provided in Eqn. 2B.

$$MF_s' = \frac{(S-\mu_s)^T \sum^{-1} (X-\mu_s)}{\left[(S-\mu_s)^T \sum^{-1} (S-\mu_s)\right]^{1/2}} \quad \text{Eqn. 2B}$$

Another class of filters determines a score or match score according to an angular difference between a pixel's spectrum and the target spectrum. One such class of filters is referred to as adaptive coherence/cosine estimator (ACE).

An example calculation of an adaptive cosine estimator $ACE_b$ is provided in Eqn. 3A, using a single background mean spectrum.

$$ACE_b = \frac{\left[(S-\mu_b)^T \sum_b^{-1} (X-\mu_b)\right]^2}{(S-\mu_b)^T \sum_b^{-1} (S-\mu_b)(X-\mu_b)^T \sum_b^{-1} (X-\mu_b)} \quad \text{Eqn. 3A}$$

An example calculation of an adaptive cosine estimator $ACE_s$ using mean subset removal is provided in Eqn. 3B.

$$ACE_s = \frac{\left[(S-\mu_s)^T \sum^{-1} (X-\mu_s)\right]^2}{(S-\mu_s)^T \sum^{-1} (S-\mu_s)(X-\mu_s)^T \sum^{-1} (X-\mu_s)} \quad \text{Eqn. 3B}$$

In each of the above examples, adjustment of one or more of the pixel spectra and target spectra (e.g., by subtracting $\mu_b$ or $\mu_s$) is accomplished during application of the appropriate filter. It is conceivable that such adjustments can be accomplished in an initial step, e.g., before application of the filter. In such a case, the values of $(S-\mu_b)$ or $(S-\mu_s)$ would be replaced by S and the values of $(X-\mu_b)$ or $(X-\mu_s)$ would be replaced by X in the equations describing the respective filter.

A measure of a degree to which a pixel's spectrum does not match a target spectrum is also determined for each pixel at 120. This measure of degree of mismatch is sometimes referred to as a measure of un-match or un-match score. One such measure of a un-match between spectra can be determined by computing a difference between a portion of a pixel's spectral energy matching a target spectrum and the total spectral energy of the pixel.

One example calculation of an un-match score U is provided in Eqn. 4, in which F can be computed according to the value $MF_b'$ determined according to Eqn. 2A or the value $MF_s'$ according to Eqn. 2B for embodiments employing mean subset removal (110).

$$U=\sqrt{|N^2-F^2|} \quad \text{Eqn. 4}$$

The scalar value N is representative of the spectral energy of a pixel and can be obtained according to the formula provided in Eqn. 5. The value $\mu^*$, in some embodiments, representing a background mean $\mu_b$, and $\Sigma$ a background covariance matrix. For embodiments using mean subset removal (110), the value $\mu^*$ represents a respective subset mean $\mu_s$, and $\Sigma$ a mean subset spectral covariance matrix.

$$N=(X-\mu^*)^T \Sigma^{-1}(X-\mu^*) \quad \text{Eqn. 5}$$

Another example calculation of an un-match score U' is provided in Eqn. 6, with the value $\mu^*$ selectable as set forth above, in which F can be computed according to the value $MF_b'$ determined according to Eqn. 2A or the value $MF_s'$ according to Eqn. 2B for embodiments employing mean subset removal (110) and U is determined by E.

$$U' = \frac{F}{U} \quad \text{Eqn. 6}$$

Yet another example calculation of an un-match score U" is provided in Eqn. 7, with the appropriate value $\mu^*$ being removed before application of the filter.

$$U'' = \frac{MF}{\left[X^T \sum^{-1} X\right]^{1/2} \sin\theta} \quad \text{Eqn. 7}$$

The value MF' can be calculated according to Eqn. 2A or Eqn. 2B, and the spectrum X represents a pre-mean-adjusted spectrum. In this instance, the value $\sin\theta$ can be determined by way of the expression in Eqn. 8.

$$\cos\theta = \frac{S^T \sum^{-1} X}{\left[S^T \sum^{-1} S\right]^{1/2} \left[X^T \sum^{-1} X\right]^{1/2}} \quad \text{Eqn. 8}$$

The various measures of spectral match and spectral unmatch are manipulated during post processing 125 to determine values for each scene pixel upon which detection can be based. For example, in at least some embodiments, the measures of spectral match can be normalized or otherwise divided by corresponding suitable un-match score. Accordingly, modified filter score values include: MF/U, MF'/U', MF'/U". Such modified values can be computed for each pixel in the imaged scene. The terms defined in equations 6 and 7, called here U' and U", are example embodiments of Unmatched Filters In some embodiments, post processing 125 includes an application of one or more rules. The rules, for example, can be simple rules implemented in coordination with, or to otherwise affect manipulation of one or more of matched scores and un-matched scores. In some embodiments, a rule compares a matched score (e.g., MF, MF', ACE) to a threshold value. Further manipulation of the match and un-match scores depends upon the results of the comparison. By way of illustrative example, a value upon which ultimate detection of a presence of the target substance is made (a "detection value") can be determined according to comparison of a matched filter score (e.g., MF or MF') to a threshold. If the matched score is greater than or equal to a threshold, the detection value is determined as the ratio of matched to unmatched scores for the pixel (e.g., MF/U, MF'/U', MF'/U").

However, if the matched score is less than the threshold, the detection value is determined as the matched filter score alone (e.g., MF, MF'). Such a rule avoids scaling pixels dominated by noise to values that might be above detection thresholds.

In some embodiments, an initial determination is made during post processing (125) as to whether the matched score (e.g., MF, MF') is positive or negative. During further post processing (125), a respective different threshold can be applied to the matched score, depending upon whether the score is positive or negative. Further manipulations can be made, for example, dividing by an appropriate un-matched score which may be the same manipulation or different manipulations for each of the positive and negative results. Even though a spatially extended target can change contrast, it is not expected to happen multiple times in the same target.

In some embodiments, any of the thresholds described herein can be provided, for example, during initialization. Thresholds can be read from a configuration file, obtained by user input, determined from one or more features of the image, and combinations of one or more of such techniques. Threshold magnitudes can be selected randomly, or determined in relation to other features, such as the time of date the terrain was imaged, associated ground temperatures, or the images of scatter plots of one or more of the filters described herein. In particular, such thresholds can be selected judiciously to minimize or otherwise eliminate false positives.

In some embodiments, one or more of the various filter scores or detection values (e.g., MF, MF', ACE, U, U', U'', MF/U, MF'/U', MF'/U'') can be standardized at 130. One such standardization, referred to as z-scoring, includes subtraction of a mean value and division by a standard deviation. Thus, for any particular filter score or detection value, a mean value is determined for the scene, for example, by averaging values of the filter score for substantially all pixels of the scene. Likewise, a standard deviation of the particular filter score or detection value is also determined. The mean and standard deviation can be stored, at least temporarily, for use in adjusting the corresponding value of each pixel of the scene.

In some embodiments, more sophisticated rules can be applied to detection values and particularly to such standardized detection values. For example, more sophisticated rule based thresholds include applying a threshold value relative to a line of perfect correlation determined as an absolute value of a difference between a matched score and a normalized matched score (e.g., |MF-MF/U|, |MF'-MF'/U'|, |MF'-MF'/U''|). More generally, such more sophisticated rules can include arithmetic combinations of one or more such detection values (e.g., combinations of MF and MF/U).

Figure 4A:
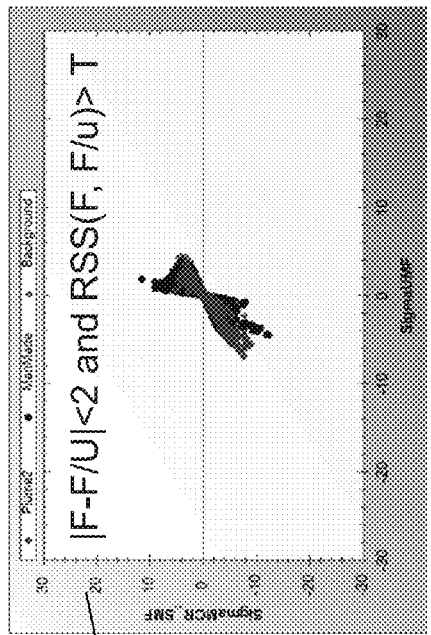
FIG. 4A through FIG. 4D illustrate the application of detection rules to detection value scatter plots.
Figure 4B:
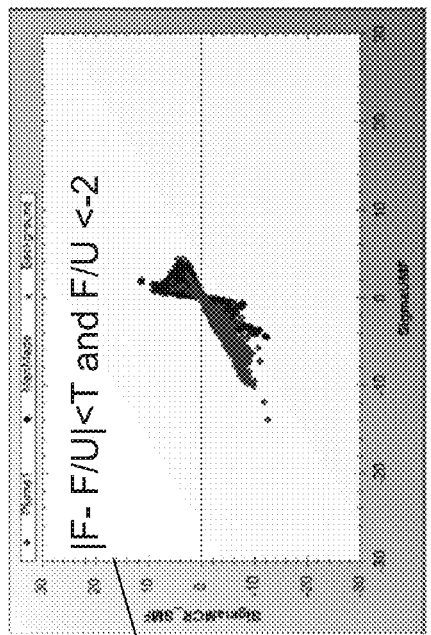

FIG. 4A through FIG. 4D shows a scatter plot of detections obtained by standard matched filter techniques MF and unmatched filter techniques (e.g., MF'/U) described herein, both obtained using subset mean spectra instead of background spectrum. FIG. 4A shows a superimposed line of perfect correlation. FIG. 4B shows detections thresholded according to the relationship provided in Eqn. 9. A detection is declared if the articulated condition is valid. "RSS" in Eqn. 9 refers to a root-sum-square operator, taking the root-sum-square combination of the terms provided within the parentheses. The value T relates to a target threshold.

$$\left\{\left|MF - \frac{MF}{U}\right| < 2\right\} \text{ AND } \left\{RSS\left(MF, \frac{MF}{U}\right) > T\right\} \qquad \text{Eqn. 9}$$

Figure 4C:
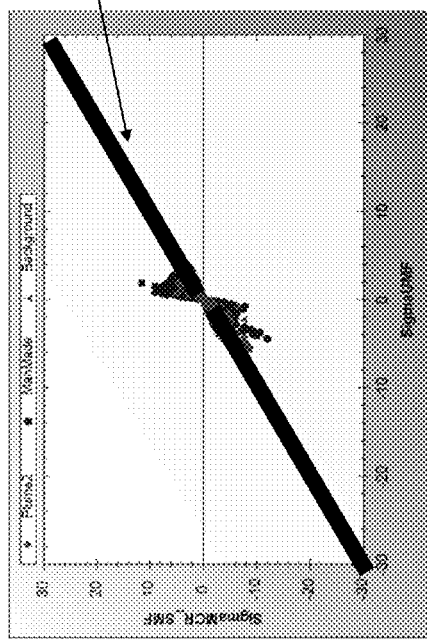

FIG. 4C shows detections thresholded according to the relationship provided in Eqn. 10. A detection is declared if the articulated condition is valid. Once again, the value T represents a threshold value. The threshold, in this example, is scaled by the ratio of matched to un-matched scores.

$$\left|MF - \frac{MF}{U}\right| < T\left(\frac{MF}{U}\right) \qquad \text{Eqn. 10}$$

Figure 4D:
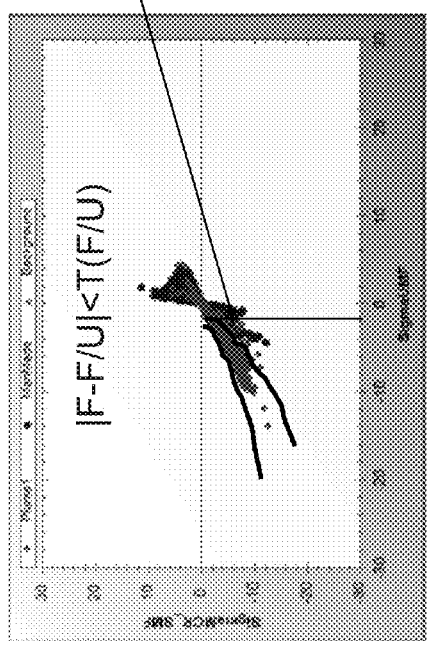

FIG. 4D shows detections thresholded according to the relationship provided in Eqn. 11. A detection is declared if the below condition is valid.

$$\left\{\left|MF - \frac{MF}{U}\right| < T\right\} \text{ AND } \left\{\frac{MD}{U} < -2\right\} \qquad \text{Eqn. 11}$$

Detection of the presence of a target substance is accomplished at 135. Detection can be accomplished for each pixel of the scene, by comparing a detection value to a threshold. For example, if the detection value is above the threshold, then a detection of the target substance is declared for that pixel. Detection can be performed for any number of pixels, up to and including all pixels of the scene.

In at least some embodiments, further processing can be applied to improve reliability of any detections. For example, a pixel-wise detection is determined as described above, then spatial filtering can be applied to adjust any such detections. Any final detection may depend upon pixel detections of collections of multiple pixels. Thus, detection at a lone pixel without detections of any neighboring pixels may be ignored or otherwise changed to a non-detection. It is conceivable that other filtering techniques can be applied in a like manner to further improve detection results.

In at least some embodiments, an image of one or more of the various filter scores or detection values (e.g., MF, MF', ACE, U, U', U'', MF/U, MF'/U', MF'/U'') can be generated at 140. As indicated, the image can be generated from one or more of the un-matched scores (120), the post processed detection values (125) and standardized detection values (130). For scalar values, a grayscale image can be generated according to the values—a range of values (e.g., 256 shades of gray) determined between maximum and minimum scores. Such images can be interpreted automatically or manually, with results of such interpretations used to further improve detection (135).

In some embodiments, the un-match scores (e.g., U, U', U'') are imaged, providing a visual representation of any regions within a scene characterized as un-matched. Such regions are indicative of or otherwise enhance non-target features that can be used to de-emphasized or otherwise ignore target detections therein during detection (135).

It is understood that the process can be repeated for more than one target spectrum using the same HSI data. For example, results can be obtained applying the process 100 for a first target substance, simply repeating the process 100 for any other target substances. For example, target substances may include elements and/or compounds as may be present in effluents or gaseous flows. Presence of one or more such target elements/compounds can provide evidence (e.g., a signature) as to activity in the imaged scene.

FIG. 5 illustrates a schematic diagram of an example of a system 200 configured for detecting a target from a hyperspectral image. As shown, the system receives input HSI data 202. As the HSI data 202 are not necessarily part of the system, they are shown in phantom. The system 200 includes a processor 204 for processing the HSI data 202. The processor 204 stores a variety of information about the HSI data 202 and the system 200, for example, in a storage device 212. The storage device 212 can include one or more storage devices that may be similar or dissimilar. The storage device 212 can include, for example, long-term storage (e.g., a hard drive, a tape storage device, flash memory), short-term storage (e.g., a random access memory, a graphics memory), and/or any other type of computer readable storage. At least a portion of the storage device 212 may be collocated with the system 200. Alternatively or in addition, at least a portion of the storage device 212 may be located remotely from the system 200, for example being accessible by a network (not shown).

The modules and devices described herein can, for example, utilize the processor 204 to execute computer-executable instructions and/or include a processor to execute computer-executable instructions (e.g., an encryption processing unit, a field programmable gate array processing unit). It should be understood that the system 200 can include, for example, other modules, devices, and/or processors known in the art and/or varieties of the illustrated modules, devices, and/or processors.

An input device 210 receives information associated with the system 200 (e.g., instructions from a user, instructions from another computing device) from a user (not shown) and/or another computing system (not shown). The input device 210 can include, for example, a keyboard, scanner or mouse or other suitable pointing device. An output device 208 provides as output, information associated with the system 200 (e.g., information to a printer (not shown), information to an audio speaker (not shown)).

A display device 206 displays information associated with the system 200 (e.g., status information, configuration information). In at least some embodiments, the processor 204 executes an operating system and/or any other computer executable instructions for the system 200 (e.g., processes the input HSI data 202 to identify or otherwise detect a presence of a target substance therein).

Figure 6:
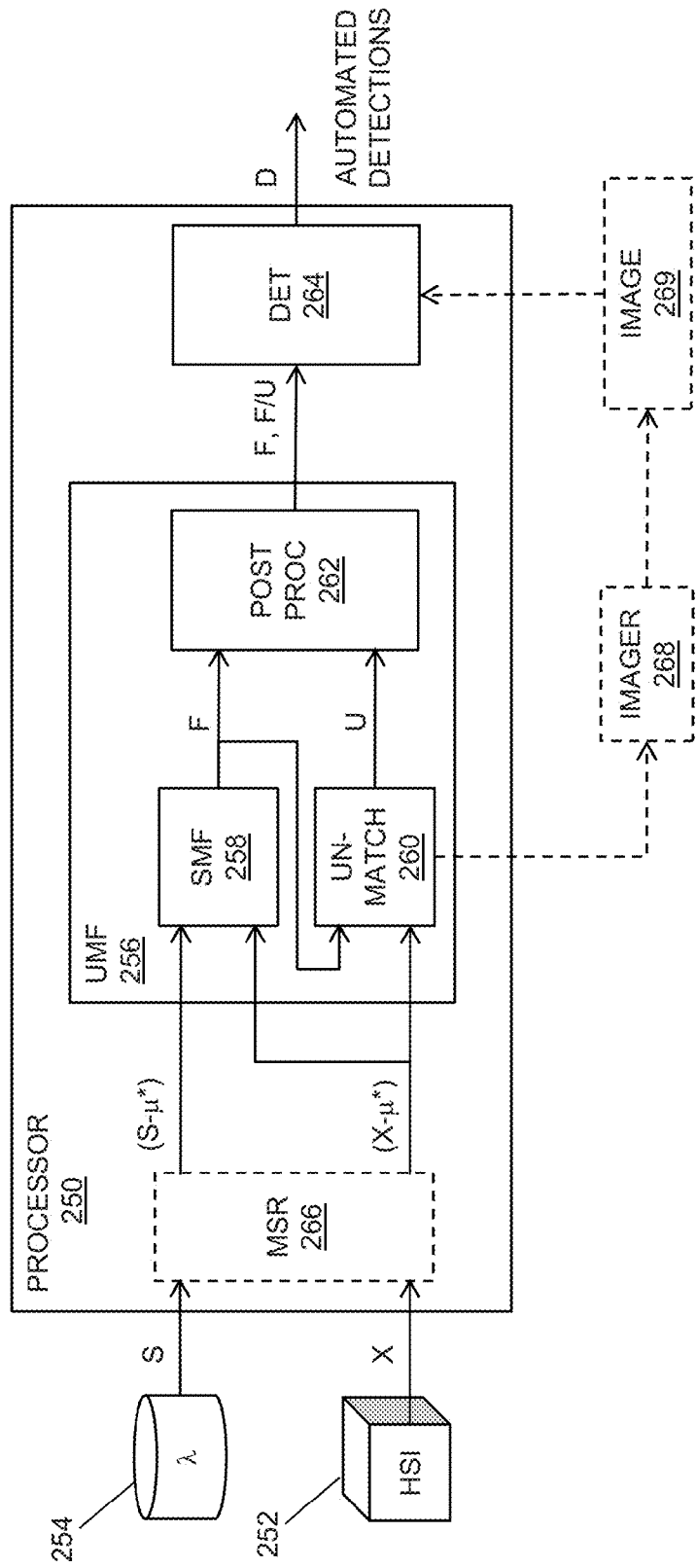
FIG. 6 illustrates a block diagram of an embodiment of the HSI data processor shown in FIG. 5.

FIG. 6 illustrates a block diagram of one embodiment of the processor 204 (FIG. 4) configured as an HSI data processor 250. The HSI data processor 250 is in communication with a target spectra storage device 254 and an HSI data storing device 252. The target spectra storage device 254 can include, for example, a database of known spectra for various substances. The HSI data processor 250 includes an un-matched filter (UMF) module 256 receiving a target spectrum from the target spectra storage device 254 and HSI data from the HSI data storing device 252. The UMF module 256 provides an output detection value to a detector 264. The detector 264 formulates a detection based on the detection value, providing any such detections as output values (e.g., a binary value indicative of the presence or absence of a target substance within a given pixel).

The UMF module 256, in turn, includes a matched filter 258, an un-matched filter 260 and a post processor 262. The matched filter 258 receives the target spectrum and pixel spectra from the HSI data storing device 252. In some embodiments, the target spectrum may be stored locally, such that it is available for processing each pixel of the HSI imaged scene, without having to retrieve the target spectrum for each pixel. For example, one or more of the matched filters and un-matched filters can be configurable according to the target spectrum. Thus, once the filter(s) are configured, they can be applied to each pixel without having to otherwise retrieve the target spectrum. The filter(s) can be reconfigured, as required, for processing more than one target substance.

The matched filter 258 determines a respective measure of a match for each pixel of the HSI data. Determinations of such matches can be made according to any suitable technique, including those described above in relation to FIG. 3 (e.g., MF, MF', ACE). Likewise, the un-matched filter 260 determines a respective measure of un-match for each pixel of the HSI data. Determinations of such un-matches can also be made according to any suitable technique, including those described above in relation to FIG. 3 (e.g., U, U', U"). Output values of each of the matched filter 258 and un-matched filter 260 are provided to the post processor 262.

The post processor 262 can be configured to manipulate or otherwise process one or more of the input values received from each of the matched filter 258 and un-matched filter 260 to determine detection values. Manipulations can include combinations of matched and un-matched filter scores. In some embodiments, manipulations include the application of one or more rules, such as those described above in relation to FIG. 3. The post processor 262 can include means for standardization (e.g., z-scoring) of any of the processed values or detection values as described above in relation to FIG. 3. In some embodiments, the post processor 262 includes more sophisticated rules according to one or more of the processed values, and/or standardized values.

The output detection values are provided to the detector 264, which formulates automatic detections, for example, according to any of the detection techniques described above in relation to FIG. 3.

In some embodiments, an image processor 268 (shown in phantom) is provided. The HSI data processor 250 forwards one or more processed values to the image processor 268. The image processor formulates a human-readable image 269, for example, including a gray-scale image of the one or more processed values. In at least some embodiments, the detector 264 is configured to accept user input, for example, resulting from inspection of the human-readable image 269. Thus, resulting detections D depend on one or more of detection values determined by the UMF module 256 and human interpretation of the human readable image 269.

In some embodiments, the HSI data processor 250 includes a mean subset removal module 266 (shown in phantom). The mean subset removal module 266 can be positioned to adjust target spectra and pixel spectra before such data is passed to the UMF module 256.

Figure 7:
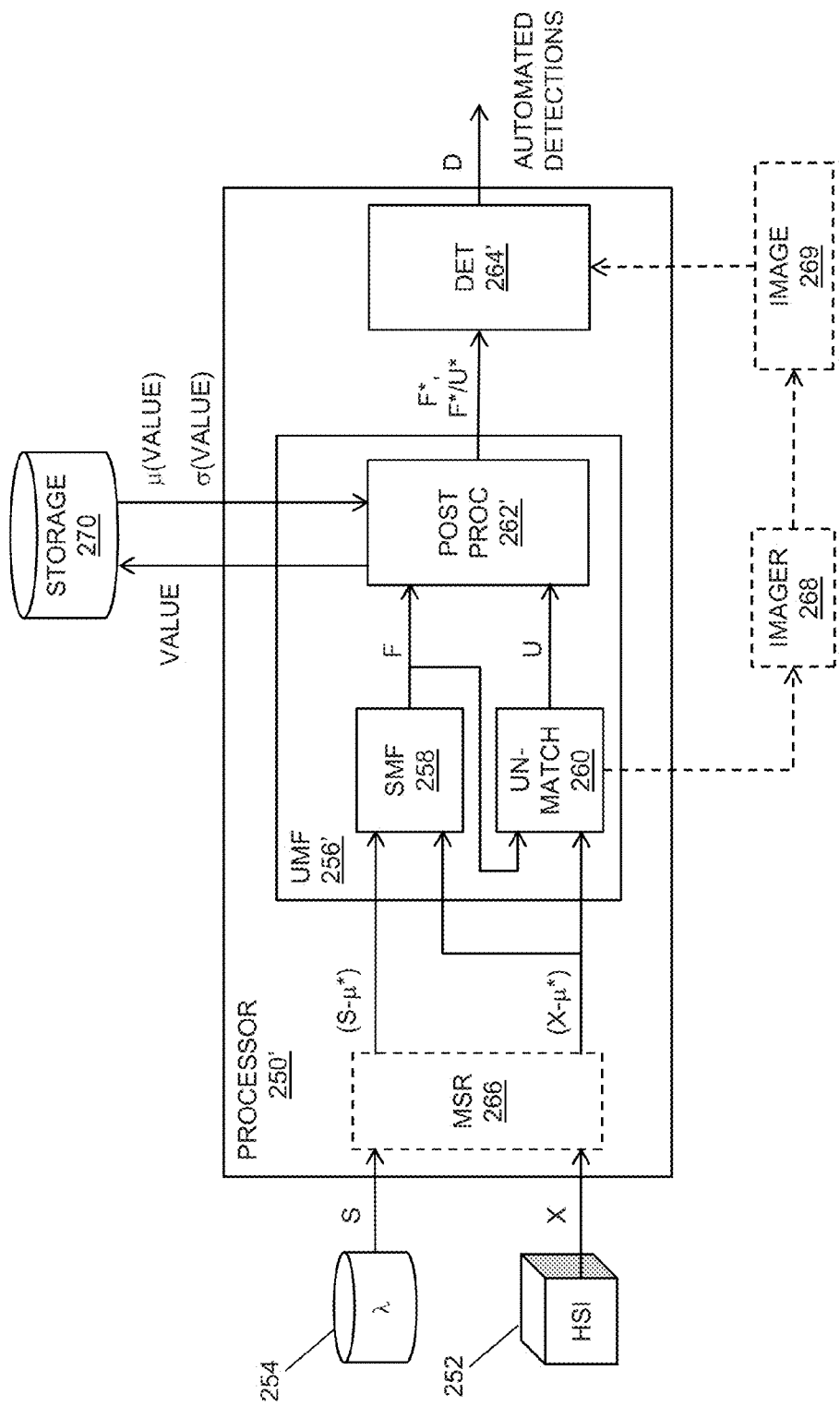
FIG. 7 illustrates a block diagram of an alternative embodiment of the HSI data processor shown in FIG. 5.

FIG. 7 illustrates a block diagram of an alternative embodiment of an HSI data processor 250'. A storage device 270 is provided in communication with at least a post processor 262'. The storage device 270 can be configured to store values, such as any of the matched scores, un-matched scores, and decision values. In at least some embodiments, the storage device 270 stores post processed values, such as one or more of mean values and standard deviations of one or more of the various matched scores, un-matched scores, and decision values as may be used in standardization of any such values. Such mean values and standard deviations can be processed or otherwise determined by the post processor 262' and provided to the storage device 270 for storage and later retrieval in support of further post processing. For embodiments including such standardizations, one or more of the post processor 262' and the detector 264' can be configured to implement more sophisticated rules, such as those described above in relation to FIG. 3.

Figure 8:
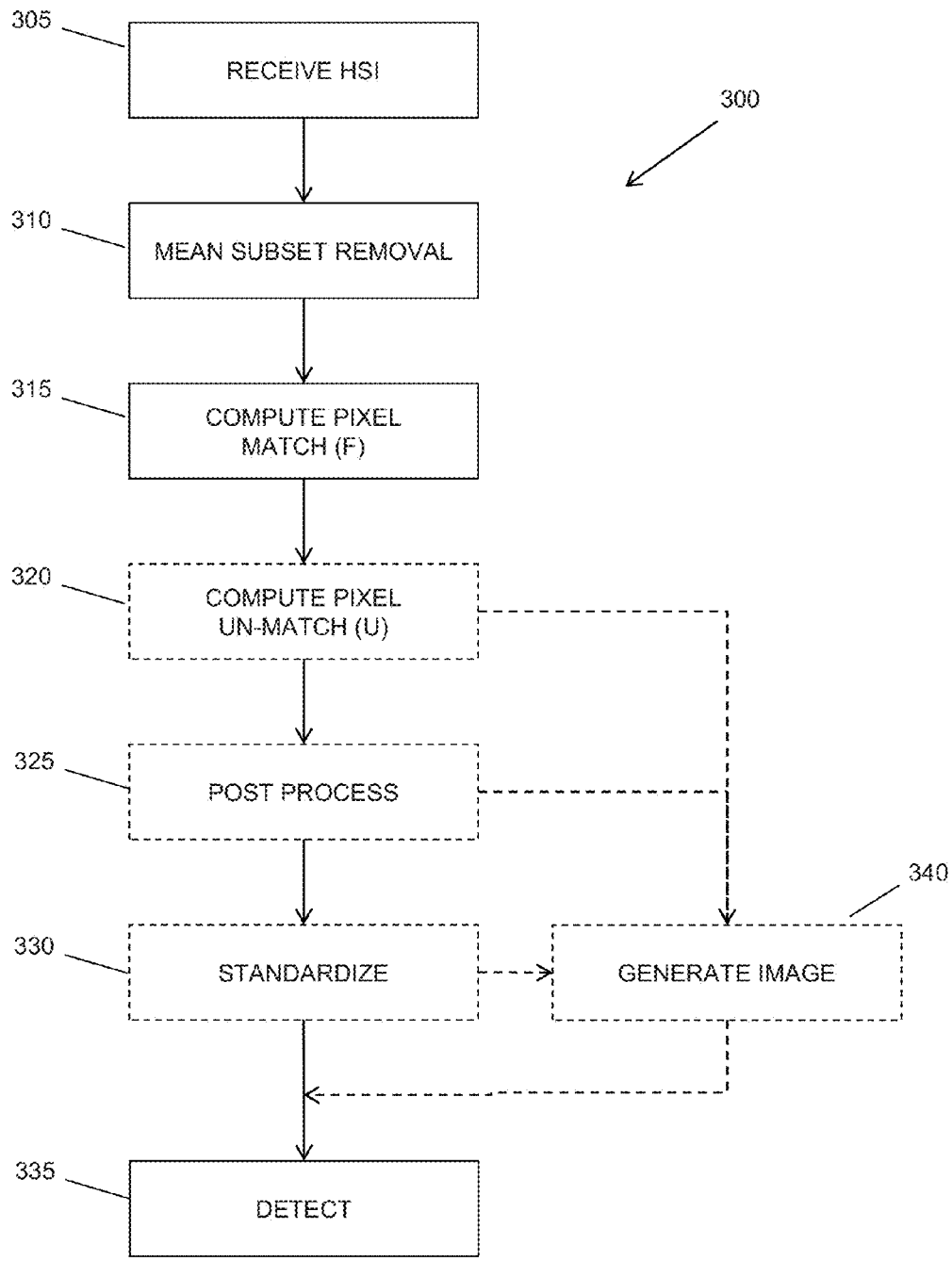
FIG. 8 illustrates a flowchart detailing alternative embodiments of techniques for processing HSI data to detect or otherwise identify sparse and/or weak targets contained therein.

FIG. 8 illustrates a flowchart detailing alternative embodiments of techniques for processing HSI data to detect or otherwise identify sparse and/or weak targets contained therein. The process 300 receives HSI data for an imaged scene at 305. A mean subset spectrum is determined as described above in relation to FIG. 3. In particular, the mean subset spectrum is advantageously determined according predetermined subsets of imaged pixels. Such pre-determined subsets can be selected to correct for sensor artifacts. For example, the subsets can be determined as columns in the imaged scene.

A measure of a match between each pixel spectrum X and the target spectrum S is determined at 315, whereby each of the compared spectra is adjusted to remove a corresponding mean subset spectrum. Such measures of a match include spectral matched filter (i.e., MF above) and more generally any suitable algorithm including the other techniques described above in relation to FIG. 3 (e.g., MF, MF', ACE). In at least some embodiments, a detection is determined at 335 based on the matched score determined at 315.

In some embodiments, a measure of un-match between each pixel spectrum X and the target spectrum S is determined at 320 (shown in phantom), whereby each of the compared spectra is also adjusted to remove a corresponding mean subset spectrum. Such measures of match and un-match can be post processed at 325 (shown in phantom), for example determining a detection measure, such as a ratio of matched to unmatched scores as described above in relation to FIG. 3, including the application of any of the rules described therein.

Still further, in some embodiments, one or more of the detection values can be standardized (e.g., z-scoring) and more sophisticated rules applied as also described in relation to FIG. 3. As in FIG. 3, an image of any of the detection values, including matching and/or un-matching scores can be generated at 340 (shown in phantom). Such an image or images can be used, for example, by human interpretation to further assist in the detection at 355.

Figure 9:
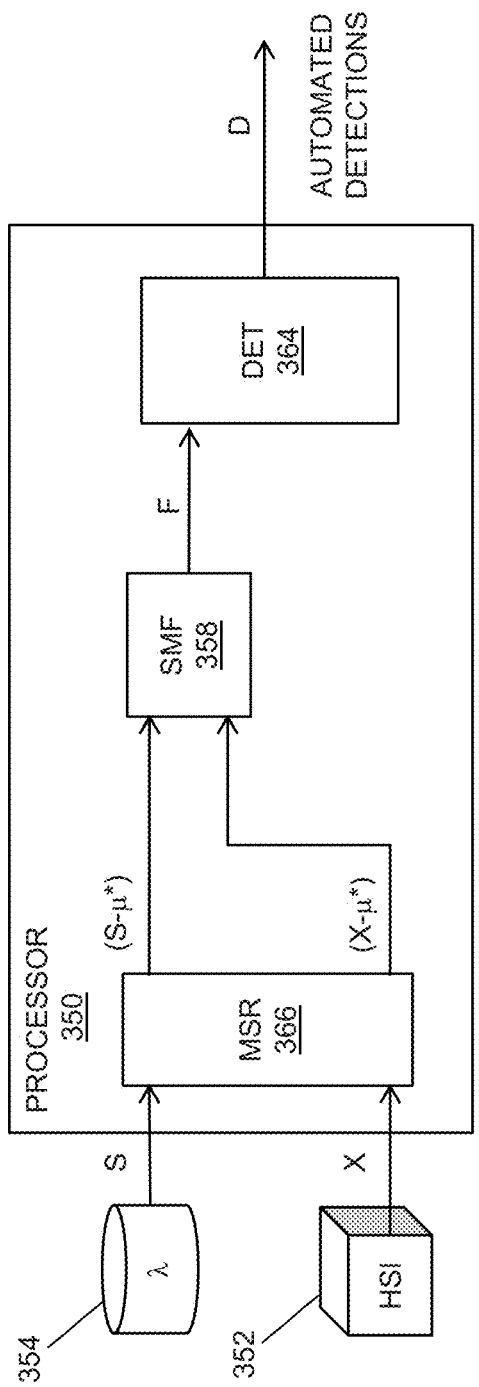
FIG. 9 illustrates a block diagram of an embodiment of the HSI data processor shown in FIG. 5.

FIG. 9 illustrates a block diagram of one embodiment of an HSI data processor 350 configured to implement mean subset removal. The processor 350 receives one or more target spectra from a target spectra storage device 354 and an HSI image data from an HSI image storing device 352. A mean subset removal module 366 receives the HSI data and target spectrum and determines mean subset spectra according to pre-determined subsets. The mean subset adjusted target spectrum and subset mean adjusted pixel spectrum are provided to a matched filter module 358. The matched filter module 358 determines a measure of match between the mean subset adjusted target and pixel spectra, providing an output score to a detector 364. The detector determines whether target substance is present in each pixel, providing an indication of such a detection for each pixel.

By using such measure of un-match U as may be obtained from un-matched filters, when used to normalize the matched filter output reduce detection false alarms due to clutter, especially when applied in combination with rule based detection. Moreover, such approaches are much simpler to implement than other techniques, such as those that compute one or more measures of "infeasibility." Beneficially, results obtainable by such approaches are closer to Gaussian distribution, thereby simplifying the setting of any threshold with predictable exceedances. Additionally, output clutter has near-zero mean, also lacking correlated features enabling automated spatial aggregation of weak, extended effluents.

From initial results using measured data of very dim effluent Applicant has observed that using each image column as the subset for means of actual sampled data reduced false alarms two to ten times for a given detection threshold level. Accordingly, minimum detectable quantity (MDQ) can be improved from about ten to about 7.5 with matched filter (MF') using mean subset removal to about five using un-matched filter UMF approach. Thus, with subset means and in combination with "un-matched" computation, targets can be identified without substantially any false detections.

In another approach, un-mixing algorithms can be used to estimate a measure of detection of multiple constituents in a single pixel. Un-mixing can be linear, non-linear or a combination of linear and non-linear. Un-mixing assumes reference spectra for each constituent (i.e., each target) are available. In some embodiments, spectra for the individual constituents are referred to as endmembers. In the present invention partial un-mixing of target reference spectra is employed to measure the presence of targets. A measure of detection endmembers is referred to as a relative abundance associated with each of one or more endmembers, the abundance relating to a proportion of the endmember represented within each pixel.

In one embodiment these estimates are combined according to a statistical technique to suppress background and reveal the presence of a dim target. In some embodiments, basis vectors related to a scene's background are identified and used in an un-mixing process. Such basis vectors can also be, but need not be, reference spectra of materials in the background. The processes described herein represent new techniques that improve minimum detectable targets, reduce false alarms due to sensor artifacts, and reduce fortuitous matches to clutter.

Figure 10:
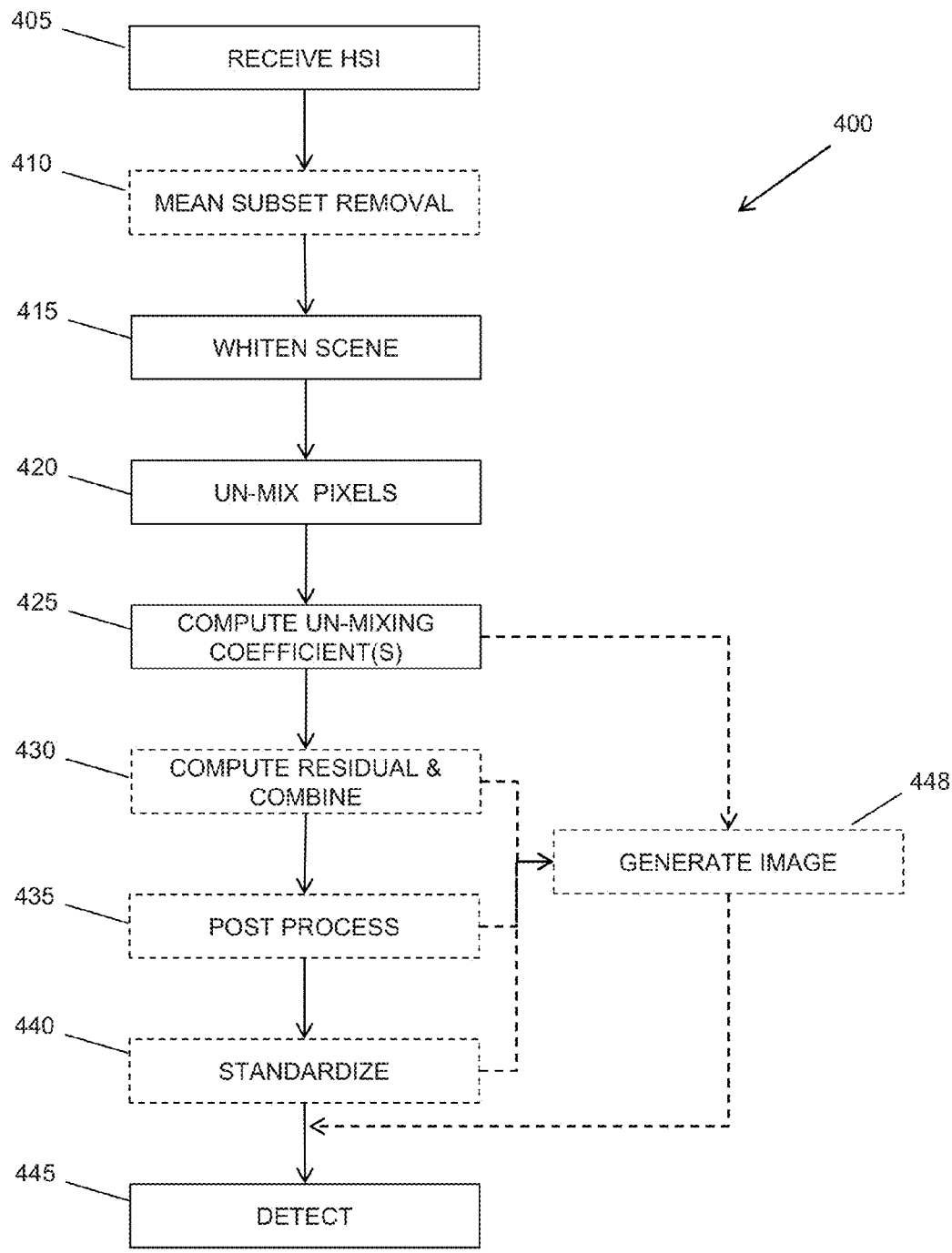
FIG. 10 illustrates a flowchart detailing other alternative embodiments of techniques for processing HSI data to detect or otherwise identify sparse and/or weak targets contained therein.

FIG. 10 illustrates a flow diagram of an embodiment of techniques for processing HSI data 58. HSI data, such as the example HSI data cube 58 shown in FIG. 1, are received at 405. In some embodiments, a mean spectrum is subtracted or otherwise removed from one or more of the pixel spectra (X) and target spectra ($\lambda_i$). The mean spectrum can be a scene or background spectrum ($\mu_b$), or subset mean spectra ($\mu_s$) as described above in relation to FIG. 3. (The corresponding act 410 is shown in phantom indicating that is optional.) The process can be repeated for substantially all pixels of an HSI imaged scene, dividing pixels of the scene into multiple subsets, determining a respective average spectrum for each subset and using the corresponding subset mean spectrum to offset or otherwise adjust the spectrum of each pixel in the subset. Such adjustments can be accomplished separately, before computation of un-mixing coefficients (as shown) or during the un-mixing process.

The imaged scene is whitened at 415. For example, the spectrum of each pixel X is processed by taking a dot product between it and a square root of an inverse covariance matrix: $\Sigma^{-1/2}X$. The covariance matrix can be determined as described above in relation to FIG. 3. For embodiments subtracting a common scene background spectrum for each pixel spectrum, $\Sigma_b^{-1/2}$ can be used, formed using the mean background spectrum $\mu_b$. For embodiments subtracting respective subset mean spectra, the inverse covariance matrix can be formed using the appropriate subset mean spectra $\mu_s$.

An estimate of the presence of each of one or more target spectra in each pixel is determined at 420 using un-mixing algorithms. Un-mixing can be linear, non-linear or a combination of linear and non-linear. Un-mixing assumes reference spectra for each constituent (i.e., each target) are available. In some embodiments, spectra for the individual constituents are referred to as endmembers. In the present invention partial un-mixing of target reference spectra is employed to measure the presence of targets. A measure of detection endmembers is referred to as a relative abundance associated with each of one or more endmembers, the abundance relating to a proportion of the endmember represented within each pixel.

In one embodiment these estimates are combined according to a statistical technique to suppress background and reveal the presence of a dim target. In some embodiments, basis vectors related to a scene's background are identified and used in an un-mixing process. Such basis vectors can also be, but need not be, reference spectra of materials in the background. The processes described herein represent new techniques that improve minimum detectable targets, reduce false alarms due to sensor artifacts, and reduce fortuitous matches to clutter.

In one approach for un-mixing, a target matrix E is formed with each column including spectral measurements (e.g., n×1 vector) of a respective one of the one or more targets ($S_i$). For example, if $S_1$ represents a vector spectrum of a first target, $G_1$ (i.e., including spectral values of the first gas $G_1$ in each of n frequency bins), $S_2$ represents the spectrum of target $G_2$ and $S_3$ represents the spectrum of target $G_3$, the resulting target matrix can be defined as E={$S_2$, $S_3$}. In general, for p constituents, each having n frequency bins, the matrix E is dimensioned according to n×p. The columns of E can also be referred to as endmembers as is generally known in partial un-mixing analysis.

Given such a combined spectral matrix E, a vector M can be computed or otherwise determined for each pixel using a partial un-mixing approach at 425, such as partial linear un-mixing (PLU). The vector M includes one element for each constituent in the matrix E. In linear algebraic terms, an approximation of the actual pixel spectrum X'=EM, which can be rearranged as Eqn. 12.

$$M = (E^T E)^{-1} E^T X'$$ Eqn. 12

The term X' represents an approximation of the actual pixel spectrum X. The individual elements of M represent the apparent abundance of each endmember or target (e.g., $G_1$, $G_2$, $G_3$), respectively, also referred to as un-mixing coefficients—the $i^{th}$ term un-mixing the target spectrum of the $i^{th}$ column of E. For a limiting case having a single constituent, M would be a scalar. In some embodiments, the elements of M are best estimates, in linear-least-square sense, of the coefficients that multiple the target spectra to equal the pixel vector. Namely, give a pixel spectrum X' and a constituent matrix E, a least squares approach can be used to determine M.

Once obtained, M can be used to determine the estimated spectrum at each pixel, X' attributable to the target constituents. A residual vector, R, is determined at 430. In some embodiments, the residual vector is determined according to a difference between the actual spectrum X (or mean adjusted spectrum, as the case may be) less that portion of the spectrum attributable to the target constituents, X'. Such a residual R represents an "un-matched" portion of the pixel, calculated as shown in Eqn. 13.

$$R = X - X'$$ Eqn. 13

The estimate of target abundance using least squares techniques is somewhat similar to but complimentary to Spectral Matched Filter. The magnitude of the residual vector |R| is similar but also complimentary to the un-matched portion U of the un-matched filter approach. In a partial un-mixing approach, the elements $M_i$ are used to estimate individual abundances of materials and targets. Thus, a measure of a match to a particular constituent within a scene can be determined according to the $i^{th}$ term of M for each pixel in the scene.

In some embodiments, post processing of one or more of the un-mixing coefficients and residual values occurs at 430 (shown in phantom). For example, the magnitude of R can be determined and one or more combinations of one or more of the individual terms of $M_i$ and |R| can be combined in a ratio (e.g., $M_i/|R|$).

In some embodiments, the elements of $M_i$ for each pixel can be standardized at 440. For example, a mean value of the $i^{th}$ term of M for all pixels in a scene can be determined as mean($M_i$). A separate mean is determined in a similar manner for each of the $i^{th}$ values of M. Likewise, a standard deviation of the $i^{th}$ term of M for all pixels in a scene can be determined as std_dev($M_i$). A separate standard deviation is determined in a similar manner for each of the $i^{th}$ values of M. Standardization of the $i^{th}$ terms of M can be accomplished by subtracting a mean value of $M_i$, mean($M_i$) from each value of $M_i$ and dividing the result by the standard deviation of Mi, std_dev ($M_i$), sometimes referred to as z-scoring. In some embodiments, a combination of this value with a measure of the residual can be derived, such as $M_i'/|R|$, for example, during detection 445.

Further processing can be accomplished (e.g., as part of detection 445) after standardizing any such values. For example, the constituent values of standardized abundances $M_i'$ can be combined into a single value indicative of a pixel's match to all constituents. Such a combination can be determined as a root-sum-square combination of the individual terms of $M_i$ for each pixel into a single scalar M+ determined for each pixel of the scene. In some embodiments, a combination of this value with a measure of the residual can be derived, such as M+/|R|. Still further processing can be accomplished to form combinations of one or more of the various terms. For example, one or more of the various terms $M_i$, $M_i'$, M+, |R|, $M_i/|R|$, $M_i'/|R|$, and M+/|R| can be determined, referred herein to generally a detection values.

Detections of received HSI data indicative of a match to one or more constituents can be determined automatically or manually at 445 according to one or more of the values: $M_i$, $M_i'$, M+, |R|, $M_i/|R|$, $M_i'/|R|$, and M+/|R|. One or more rules can be applied to any of these values, such that detection of any constituents depends upon the applied rule. For example, any of these values can be compared to a threshold value, with a detection being declared for values above the respective threshold.

In some embodiments, images of one or more of these values $M_i$, $M_i'$, M+, |R|, $M_i/|R|$, $M_i'/|R|$, and M+/|R| are formed at 448 for human interrogation. Such images can be formed as grayscale images with a grayscale pixel value corresponding to the pixels respective value of the imaged term.

In a variant approach, basis vectors are next obtained or otherwise provided for the HSI imaged scene at 420. For example, an imaged scene can be processed to identify a number of basis vectors BV able to span at least a portion of the scene. Basis vectors of a vector space are generally understood to be linearly independent and to span the space. Techniques for identifying basis vectors are generally known, and in the context of HSI data cube processing, are described in co-pending U.S. patent application Ser. No. 12/475,145, entitled "Improved Hyperspectral Image Dimensionality Reduction," filed on May 29, 2009, incorporated herein by reference in its entirety.

Such basis vectors, once determined or otherwise obtained can be added to the matrix E*. Accordingly, E* will include one or more columns of target spectra $S_i$ and additional columns of basis vectors $BV_j$: E={$S_1$, $S_2$, ... $S_p$, $BV_{p+1}$, $BV_{p+2}$, ..., $BV_q$}, with each column of dimension n×1.

Given such a combined spectral matrix E*, a vector α representing un-mixing coefficients can be computed or otherwise determined for each pixel using a partial un-mixing approach at 425, such as partial linear un-mixing (PLU). The vector α includes q elements, one for each constituent in the matrix E. In linear algebraic terms, an approximation of the actual pixel spectrum X", is represented by E*·α=X". Rearranging terms and solving for α by standard linear algebraic techniques yields:

$$\alpha = (E^{*T} \cdot E^*)^{-1} E^{*T} \cdot X''$$ Eqn. 14

For q endmembers/basis vectors in an n-band spectral data set, the matrix E* is an n×q matrix formed having q columns, with each column representing a respective different n-dimensional basis vector or target spectrum. The matrix $\alpha$ is a q×1 matrix including q un-mixing coefficients, $\alpha_i$. The coefficients can be grouped into a first subset $\alpha_{Ti}$ that best match the p target vectors to a pixel, and second subset $\alpha_{BVi}$ that best match the q-p basis vectors to a pixel.

Once obtained, $\alpha$ can be used to determine the estimated spectrum at each pixel, X" attributable to the target constituents. A residual vector, $R_H$, can be determined at 430 according to a difference of the actual spectrum X (or adjusted spectrum, as the case may be) less that portion of the spectrum attributable to the target constituents, X" as shown in Eqn. 15. Such a residual $R_H$ represents an "un-matched" portion of the pixel. Generally, a larger value of R or $R_H$ indicates a poor match to target and/or background.

$$R_H = X - X'' \qquad \text{Eqn. 15}$$

When just one target vector is utilized that element is referred to as $\alpha_H$. Note, $\alpha_H$ does not equal M from the first embodiment nor does R equal $R_H$.

In some embodiments, the elements of $\alpha_i$, can be combined, for example during post processing at 435 (shown in phantom), forming combinations of one or more of $\alpha$, $|R_H|$, and $\alpha/|R_H|$.

Similar to the previous un-mixing embodiments, for each target, detection is determined at 445 using its respective alpha un-mixing coefficient and in at least some embodiments, also by dividing alpha by $R_H$. In some embodiments, images of $\alpha$, $|R_H|$, and $\alpha/|R_H|$ are formed at 555 for human interrogation at 560.

In some embodiments, the elements of $\alpha_i$ for each pixel can be standardized at 440. For example, a mean value of the $i^{th}$ term of $\alpha$ for all pixels in a scene can be determined as mean($\alpha_i$). A separate mean is determined in a similar manner for each of the $i^{th}$ values of $\alpha$. Likewise, a standard deviation of the $i^{th}$ term of $\alpha$ for all pixels in a scene can be determined as std_dev($\alpha_i$). A separate standard deviation is determined in a similar manner for each of the $i^{th}$ values of M. Standardization of the $i^{th}$ terms of $\alpha$ can be accomplished by subtracting a mean value of $\alpha_i$, mean($\alpha_i$) from each value of $\alpha_i$ and dividing the result by the standard deviation of Mi, std_dev ($\alpha_i$), sometimes referred to as z-scoring. In some embodiments, a combination of this value with a measure of the residual can be derived, such as $\alpha_i'/|R_H|$, for example, during detection 445.

Further processing can be accomplished (e.g., as part of detection 445) after standardizing any such values. For example, the constituent values of standardized abundances $\alpha_i'$ can be combined into a single value indicative of a pixel's match to all constituents. Such a combination can be determined as a root-sum-square combination of the individual terms of $\alpha_i$ for each pixel into a single scalar $\alpha+$ determined for each pixel of the scene. In some embodiments, a combination of this value with a measure of the residual can be derived, such as $\alpha+/|R_H|$. Still further processing can be accomplished to form combinations of one or more of the various terms. For example, one or more of the various terms $\alpha_i$, $\alpha_i'$, $\alpha+$, $|R_H|$, $\alpha_i/|R_H|$, $\alpha_i'/|R_H|$, and $M+/|R_H|$ can be determined, referred to generally a detection values.

In some embodiments, all of the target terms $\alpha_{Ti}$ are combined in a single term via root-sum-square combination, referred to as $\alpha_T+$. Alternatively or in addition, a measure of substantially all of the energy in a pixel spectrum that is not target is formed as the root-sum-square combination of all basis vector coefficients $\alpha_{BVi}$ and the residuals $R_H$, referred to herein as the value CRSS.

Detections of received HSI data indicative of a match to one or more constituents can be determined automatically or manually at 445 according to one or more of the values: $\alpha_{Ti}$, $\alpha_{Ti}/|R_H|$, $\alpha_{BVi}$, $\alpha_{BVi}/|R_H|$, $\alpha+$, $\alpha+/|R_H|$, $\alpha_T+$, $\alpha_T+/|R_H|$, CRSS, $\alpha_{Ti}/\text{CRSS}$, $\alpha+/\text{CRSS}$. One or more rules can be applied to any of these values, such that detection of any constituents depends upon the applied rule. For example, any of these values can be compared to a threshold value, with a detection being declared for values above the respective threshold. As described above in relation to FIG. 3, which detection value is determined for each pixel can depend upon comparison of a value to a threshold. For example, if the detection value $\alpha+$ is below a threshold, the value itself is used as a detection value. If the detection value $\alpha+$ is above the threshold, then it is divided by $|R_H|$. Likewise, more sophisticated rules can be applied, for example, after standardizing one or more of the detection values.

In some embodiments, images of one or more of these values $\alpha_{Ti}$, $\alpha_{Ti}/|R_H|$, $\alpha_{BVi}$, $\alpha_{BVi}/|R_H|$, $\alpha+$, $\alpha+/|R_H|$, $\alpha_T+$, $\alpha_T+/|R_H|$, CRSS, $\alpha_{Ti}/\text{CRSS}$, $\alpha+/\text{CRSS}$ are formed at 448 for human interrogation. Such images can be formed as grayscale images with a grayscale pixel value corresponding to the pixels respective value of the imaged term.

Figure 11:
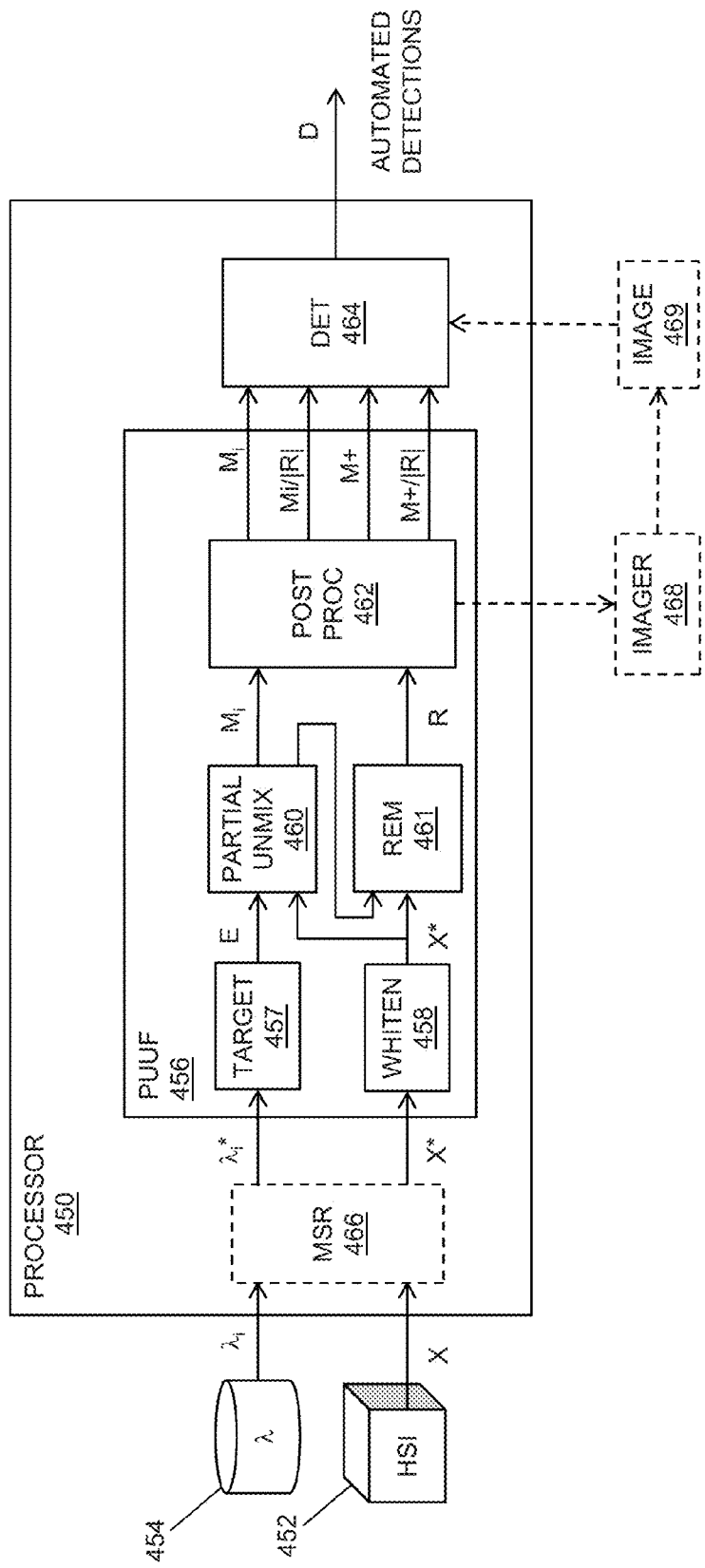
FIG. 11 illustrates a block diagram of an alternative embodiment of the HSI data processor shown in FIG. 5.

FIG. 11 illustrates a block diagram of one embodiment of an embodiment of the processor 204 (FIG. 5) configured as an HSI data processor 450. The HSI data processor 450 is in communication with a target spectra storage device 454 and an HSI data storing device 452. The HSI data processor 250 includes a partially unmixed-unmatched filter (PUUF) module 456 receiving a target spectrum from the target spectra storage device 454 and HSI data from the HSI data storing device 452. The PUUF module 456 provides an output detection value to a detector 464, which formulates a detection based on the detection value, providing detections as output.

The PUUF module 456, in turn, includes a target spectra module 457 and a pixel spectrum whitening module 458. The target spectra module 457 generates the target spectra matrix E from the spectra of the one or more targets. The pixel whitening module 458 whitens the spectrum of each pixel, for example, taking a dot product of a square root of an inverse covariance matrix and the pixel spectrum $\Sigma^{-1/2}X$.

The PUUF module 456 also includes a partially un-mixing filter 460, a remainder filter 461 and a post processor 462. The partially un-mixing filter 460 receives a matrix E including the one or more target spectra and the whitened pixel spectra from the pixel whitening filter 458. In some embodiments, the target spectra matrix E may be stored locally, such that it is available for processing each pixel of the HSI imaged scene, without having to retrieve the target spectrum for each pixel. For example, one or more of the partially un-mixing and remainder filters 460, 461 can be configurable according to the target spectrum. Thus, once the filter(s) 460, 461 are configured, they can be applied to the respective spectrum each pixel without having to otherwise retrieve the target spectrum. The filter(s) 460, 461 can be reconfigures, as required, for processing of more than one target substance.

The partially un-mixing filter 260 determines a respective measure of an abundance of each target in the spectrum of each pixel of the HSI data. Determinations of such abundances can be made according to any suitable technique, including those described above in relation to FIG. 10. Likewise, the remainder filter 261 determines a respective measure of un-matched spectral energy for each pixel of the HSI data. Determinations of such remainders can also be made according to any suitable technique, including those described above in relation to FIG. 10. Output values of each of the partially un-mixing filter 260 and remainder filter 261 are provided to the post processor 462.

The post processor 462 can be configured to manipulate or otherwise process one or more of the input values received from each of the partially un-mixing filter 260 and remainder filter 261 to determine detection values. Manipulations can include combinations of abundances and remainder filter scores. In some embodiments, manipulations include the application of one or more rules, such as those described above in relation to FIG. 10. The post processor 462 can include standardization (e.g., z-scoring) of any of the processed values or detection values as described above in relation to FIG. 10. In some embodiments, the post processor 462 includes more sophisticated rules according to one or more of the processed values, and/or standardized values.

The output detection values are provided to the detector 464, which formulates automatic detections, for example, according to any of the detection techniques described above in relation to FIG. 10.

In some embodiments, an image processor 468 (shown in phantom) is provided. The HSI data processor 450 forwards one or more processed values to the image processor 468. The image processor formulates a human-readable image 469, for example, including a gray-scale image of the one or more processed values. In at least some embodiments, the detector 464 is configured to accept user input, for example, resulting from inspection of the human-readable image 469. Thus, resulting detections, D, depend on one or more of detection values determined by the PUUF module 456 and human interpretation of the human readable image 469.

In some embodiments, the HSI data processor 450 includes a mean subset removal module 466 (shown in phantom).

Figure 12:
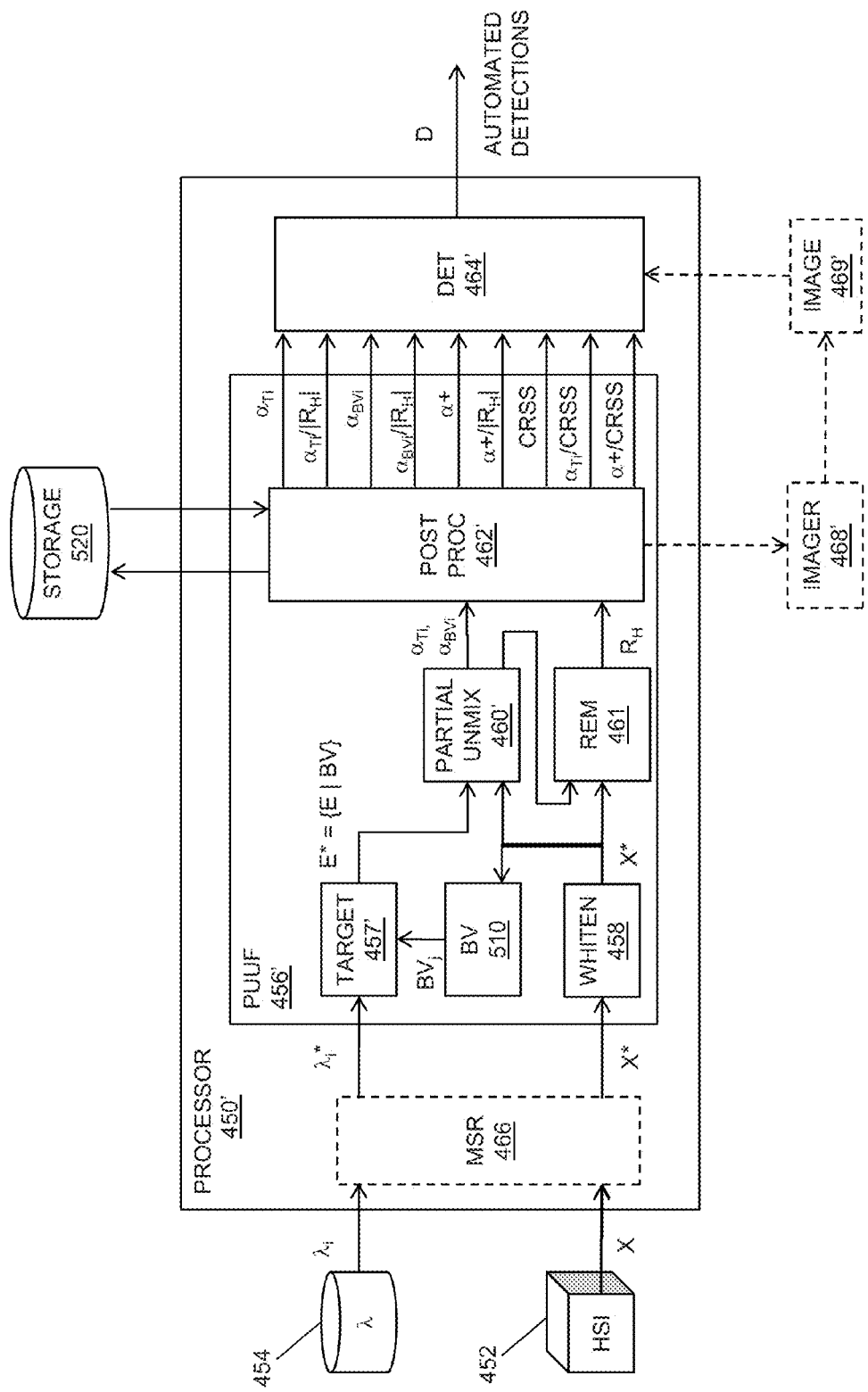
FIG. 12 illustrates a block diagram of yet another alternative embodiment of the HSI data processor shown in FIG. 5.

FIG. 12 illustrates a block diagram of an alternative embodiment of an HSI data processor 450'. The target module 452' is configured to generate a matrix E* including a respective column for each spectrum of one or more target substances to be un-mixed and additional respective columns for basis vectors spanning the imaged scene. In some embodiments, the basis vectors are received from another source. Alternatively or in addition the PUUF module 456' includes a basis vector module 510 configured to generate or otherwise determine basis vectors associated with the imaged scene received from the HSI data storing device 452.

In some embodiments, a storage device 520 is provided in communication with at least a post processor 462'. The storage device 270 can be configured to store values, such as any of the un-mixing coefficients or abundances, residuals, and decision values. In at least some embodiments, the storage device 520 stores post processed values, such as one or more of mean values and standard deviations of one or more of the various matched scores, un-matched scores, and decision values as may be used in standardization of any such values. Such mean values and standard deviations can be processed or otherwise determined by the post processor 462' and provided to the storage device 520 for later retrieval in further post processing. For embodiments including such standardizations, one or more of the post processor 462' and the detector 464' can be configured to implement more sophisticated rules, such as those described above in relation to FIG. 10.

Figure 13:
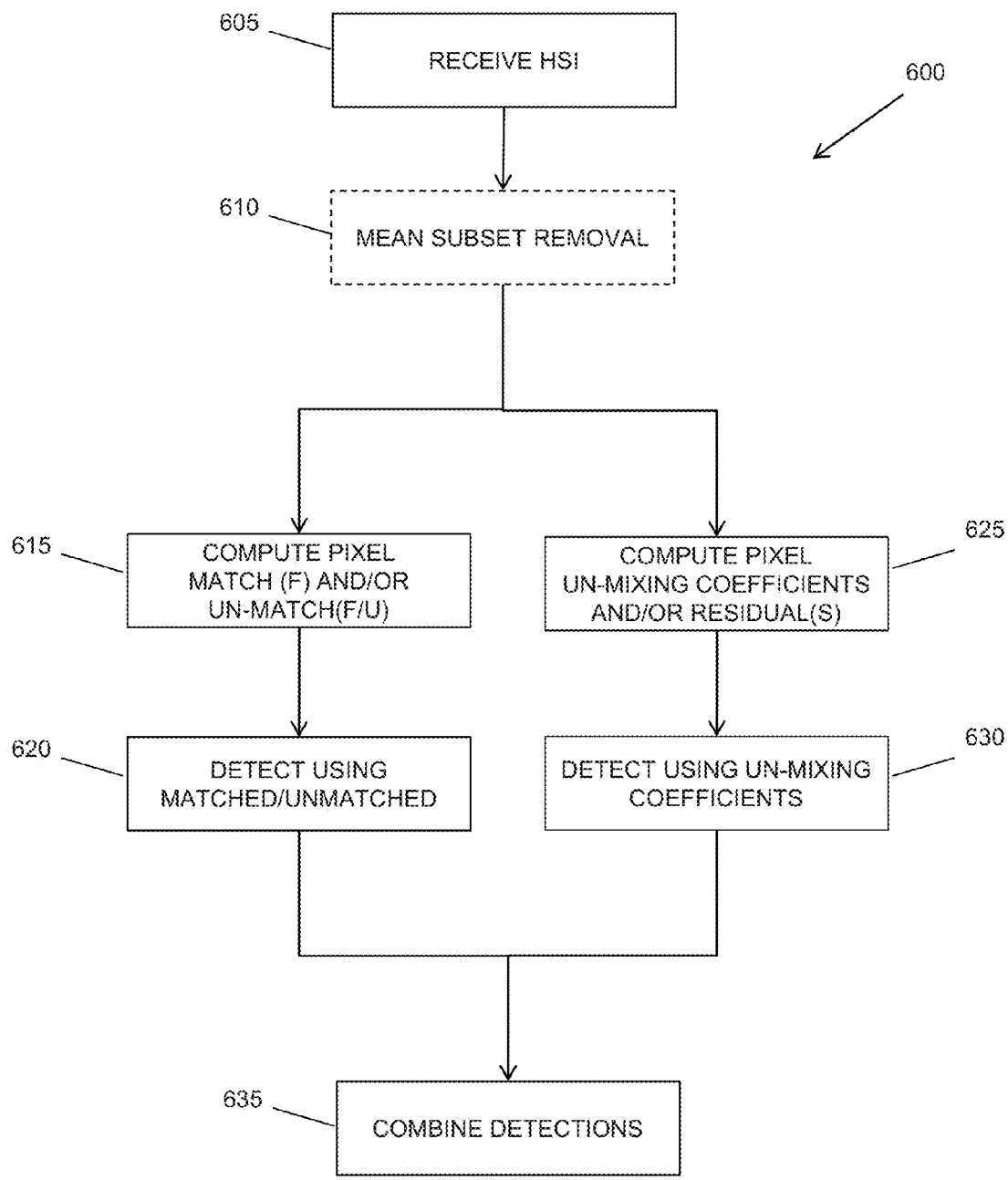
FIG. 13 illustrates a flowchart detailing another alternative embodiment of a technique for processing HSI data to detect or otherwise identify sparse and/or weak targets contained therein.

FIG. 13 illustrates a flowchart detailing another alternative embodiment of a technique for processing HSI data to detect or otherwise identify sparse and/or weak targets contained therein. HSI data, such as the example HSI data cube 58 shown in FIG. 1, is received at 605. In some embodiments, a mean spectrum is subtracted or otherwise removed from one or more of the pixel spectra (X) and target spectra ($\lambda_t$). The mean spectrum can be a scene or background spectrum ($\mu_b$), or subset mean spectra ($\mu_s$) as described above in relation to FIG. 3. (The corresponding act 610 is shown in phantom indicating that is optional.) The process can be repeated for substantially all pixels of an HSI imaged scene, dividing pixels of the scene into multiple subsets, determining a respective average spectrum for each subset and using the corresponding subset mean spectrum to offset or otherwise adjust the spectrum of each pixel in the subset. Such adjustments can be accomplished separately, before computation of matched scores or un-mixing coefficients (as shown) or during the matched filtering or un-mixing processes.

A measure of a degree to which a pixel's spectrum matches a target spectrum is determined for each pixel at 615. This measure can be determined, for example, as described above in relation to FIG. 3, including determination of one or various detection values, including determination of un-matching scores. A partial detection is determined at 620 based on one or more detection values determined by a matching process as in 615.

Likewise, an estimate of the presence of each of one or more target spectra in each pixel is determined at 625 using un-mixing algorithms. This measure can be determined, for example, as described above in relation to FIG. 10, including determination of one or various detection values, including determination of un-mixing coefficients, such as relative abundances. A partial detection is determined at 630 based on one or more detection values determined by an un-mixing process as in 625.

An overall detection is determined at 635 in response to each of the partial detections 620, 630. The overall detection can be determined on a pixel by pixel basis for the imaged scene. The overall detection can also be determined according to application of a rule. In one example, the detections are combined in a logical and, such that an overall detection is declared only if a partial detection is determined at 620 and 630. It has been observed that such combinations result in favorable detection performance.

Figure 14:
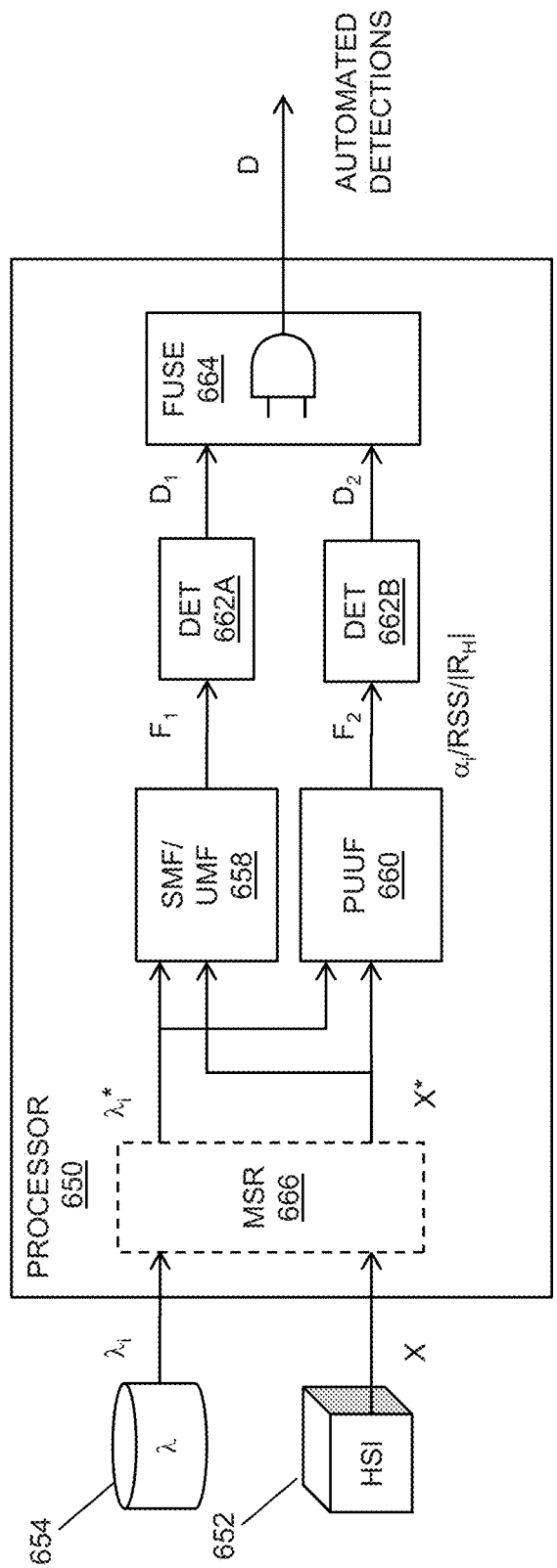
FIG. 14 illustrates a block diagram of yet another alternative embodiment of the HSI data processor shown in FIG. 5.

FIG. 14 illustrates a block diagram of an alternative embodiment of an HSI data processor 650. The HSI data processor 650 is in communication with a target spectra storage device 654 and an HSI data storing device 652. The HSI data processor 650 includes a spectral matched filter and/or unmatched filter module 658 and a partially unmixed-unmatched filter (PUUF) module 660. Each filter module 658, 660 receives a target spectrum from the target spectra storage device 654 and HSI data from the HSI data storing device 652. The spectral matched filter and/or unmatched filter module 658 provides an output detection value to a partial detector 662A, which formulates a detection based on the detection value, providing detections as output. The PUUF module 656 provides an output detection value to a partial detector 662B, which formulates a detection based on the detection value, providing detections as output.

The outputs of each partial detector 662A, 662 are input to a combiner 664, which is configured to determine an overall detection for each pixel based upon a combination of outputs of the partial detectors 662A, 662B. In the illustrative example, the combiner implements a logical "and," providing an output detection D, only if receiving partial detections from both of the partial detectors 662A, 662B.

The above-described systems and methods can be implemented in digital electronic circuitry, in computer hardware, firmware, and/or software. The implementation can be as a computer program product (i.e., a computer program tangibly embodied in an information carrier). The implementation can, for example, be in a machine-readable storage device for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application specific integrated circuit). Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computing device having a display device. The display device can, for example, be a cathode ray tube (CRT) and/or a liquid crystal display (LCD) monitor, and/or a light emitting diode (LED) monitor. The interaction with a user can, for example, be a display of information to the user and a keyboard and a pointing device (e.g., a mouse or a trackball) by which the user can provide input to the computing device (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computing device having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computing devices and having a client-server relationship to each other.

Communication networks can include packet-based networks, which can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The computing device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a World Wide Web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method of determining the presence of a target substance, the method comprising:

receiving a hyperspectral image comprising spectra of a plurality of scene pixels indicative of light and other radiation absorbed by or emitted from, a target substance;

determining from a subset of scene pixels a respective mean spectrum, wherein the mean spectrum is an n-dimensional vector of values corresponding to the subset of scene pixels, n being a number of frequency bins;

adjusting a spectrum of each scene pixel in the subset through subtraction of the respective mean spectrum from the respective spectrum of the scene pixel;

repeating the acts of determining a respective mean spectrum and adjusting each scene pixel for other subsets of scene pixels of the received hyperspectral image;

determining for each adjusted scene pixel, a measure of spectral match between a respective spectrum of the scene pixel and a reference spectrum of the target substance;

determining for each adjusted scene pixel, a quantitative measure of spectral mismatch between the respective spectrum of the scene pixel and the reference spectrum of the target substance; and detecting a presence of the target substance within the hyperspectral image in response to the determined measure of spectral match and the determined quantitative measure of spectral mismatch, wherein the detecting includes forming a ratio of the measure of spectral match based on mixture coefficients and the measure of spectral mismatch based on a residual spectrum, the ratio being indicative of presence of the target substance within the scene pixel.

2. The method of claim 1, wherein determining the measure of spectral match comprises applying a matched filter to the spectrum of the scene pixel.

3. The method of claim 1, wherein determining the measure of spectral match comprises applying a filter adapted to measure angular deviation between the spectrum of the scene pixel and the reference spectrum of the target substance.

4. The method of claim 1, wherein determining the measure of spectral mismatch comprises determining spectral energy of the scene pixel not matched or otherwise in the direction of the reference spectrum of the target substance.

5. The method of claim 4, further comprising generating a human-readable image indicative of the determined measure of spectral mismatch for scene pixels of the hyperspectral image, the human-readable image usable in detecting presence of the target substance within the hyperspectral image.

6. The method of claim 4, further comprising standardizing for each scene pixel the determined measure of spectral match and the determined measure of spectral mismatch.

7. The method of claim 6, wherein standardizing the determined measure of spectral match and the determined measure of spectral mismatch comprises determining a respective z-score for each measure.

8. The method of claim 7, wherein detecting a presence of the target substance comprises forming a ratio of the standardized measure of spectral match and the standardized measure of spectral mismatch, the ratio being indicative of presence of the target substance within the scene pixel.

9. The method of claim 8, wherein detecting a presence of the target comprises applying a rule, whereby formulation of the ratio is accomplished selectively in response to application of the rule.

10. The method of claim 4, further comprising applying a spatial filter, detection of the presence of the target substance within the hyperspectral image being in response to the determined measures of spectral match and spectral mismatch subject to the spatial filter.

11. The method of claim 1, wherein detecting a presence of the target comprises applying a rule, whereby formulation of the ratio is accomplished selectively in response to application of the rule.

12. An apparatus for detecting the presence of a target substance, comprising:

image storage configured to store at least a portion of a hyperspectral image comprising spectra of a plurality of scene pixels indicative of light and other radiation absorbed by or emitted from, a target substance;

target spectra storage configured to store a reference spectrum of the target substance;

a filter in communication with the image storage, the filter configured to determine from a subset of scene pixels a respective mean spectrum, wherein the mean spectrum is an n-dimensional vector of values corresponding to the subset of scene pixels, n being a number of frequency bins, and to adjust a spectrum of each scene pixel in the subset through subtraction of the respective mean spectrum from the scene pixel spectrum, and to repeat the acts of determining a respective mean spectrum and adjusting each scene pixel for other subsets of scene pixels in the received hyperspectral image;

a target scoring engine in communication with the target spectra storage and at least one of the image storage and the filter, the target scoring engine configured to determine for each scene pixel a measure of spectral match between a respective spectrum of the scene pixel and a reference spectrum of the target substance;

a non-target scoring engine in communication with the target spectra storage and at least one of the image storage and the filter, the non-target scoring engine configured to determine for each scene pixel a quantitative measure of spectral mismatch between a respective spectrum of the scene pixel and the reference spectrum of the target substance; and a target detector in communication with the target scoring engine and the non-target scoring engine, the target detector configured to determine presence of the target substance within the hyperspectral image in response to the determined measure of spectral match and the determined quantitative measure of spectral mismatch, including forming a ratio of the measure of spectral match based on mixture coefficients and the measure of spectral mismatch based on a residual spectrum, the ratio being indicative of presence of the target substance within the scene pixel.

13. The apparatus of claim 12, wherein the target scoring engine comprises a filter selected from the group consisting of: spectral matched filters and adaptive coherence/cosine estimator (ACE) filters.

14. The apparatus of claim 12, further comprising a human readable image generator in communication with the non-target scoring engine, the image generator adapted to generated image indicative of the determined measure of spectral mismatch for scene pixels of the hyperspectral image, the human readable image generator usable in detecting presence of the target substance within the hyperspectral image.

15. The apparatus of claim 12, wherein the target detector comprises a rule engine configured to implement a predetermined rule, wherein the target detector is configured to determine presence of the target substance within the hyperspectral image in response to the determined measures of spectral match and spectral mismatch according to the predetermined rule.

16. An apparatus for detecting the presence of the target substance, comprising
- means for receiving a hyperspectral image comprising spectra of a plurality of scene pixels indicative of light and other radiation absorbed by or emitted from, a target substance;
- means for determining from a subset of scene pixels a respective mean spectrum;
- means for adjusting a spectrum of each scene pixel in the subset through subtraction of the respective mean spectrum from the respective spectrum of the scene pixel, wherein the mean spectrum is an n-dimensional vector of values corresponding to the subset of scene pixels, n being a number of frequency bins;
- means for repeating the acts of determining a respective mean spectrum and adjusting each scene pixel for other subsets of scene pixels of the received hyperspectral image;
- means for determining for each adjusted scene pixel, a measure of spectral match between a respective spectrum of the scene pixel and a reference spectrum of the target substance;
- means for determining for each adjusted scene pixel, a quantitative measure of spectral mismatch between the respective spectrum of the scene pixel and the reference spectrum of the target substance; and
- means for detecting a presence of the target substance within the hyperspectral image in response to the determined measure of spectral match and the determined quantitative measure of spectral mismatch, wherein the detecting includes forming a ratio of the measure of spectral match based on mixture coefficients and the measure of spectral mismatch based on a residual spectrum, the ratio being indicative of presence of the target substance within the scene pixel.

* * * * *